United States Patent
Kriesel et al.

(10) Patent No.: US 12,275,874 B1
(45) Date of Patent: *Apr. 15, 2025

(54) THERMOSET VISCOELASTOMERIC POLYMER AND PRODUCTS THEREOF

(71) Applicant: Universal Tech Corporation, Ettrick, WI (US)

(72) Inventors: Matthew Wayne Kriesel, Melrose, WI (US); Troy Bradley Goodenough, Mindoro, WI (US)

(73) Assignee: Universal Tech Corporation

( * ) Notice: Subject to any disclaimer, the term of this patent is extended or adjusted under 35 U.S.C. 154(b) by 0 days.

This patent is subject to a terminal disclaimer.

(21) Appl. No.: 17/460,196

(22) Filed: Aug. 28, 2021

Related U.S. Application Data

(63) Continuation-in-part of application No. 15/731,815, filed on Aug. 7, 2017, now Pat. No. 11,124,596, which is a continuation-in-part of application No. 14/999,722, filed on Jun. 20, 2016, now Pat. No. 10,807,767.

(60) Provisional application No. 62/231,004, filed on Jun. 22, 2015.

(51) Int. Cl.
C09J 7/38 (2018.01)
C09J 11/08 (2006.01)

(52) U.S. Cl.
CPC .............. C09J 7/38 (2018.01); C09J 11/08 (2013.01); C09J 2301/408 (2020.08); C09J 2475/00 (2013.01); C09J 2491/00 (2013.01)

(58) Field of Classification Search
CPC ........ C09J 7/38; C09J 11/08; C09J 2301/408; C09J 2475/00; C09J 2491/00
See application file for complete search history.

(56) References Cited

U.S. PATENT DOCUMENTS

| | | | |
|---|---|---|---|
| 3,507,071 A | 4/1970 | Bryson | |
| 5,677,413 A | 10/1997 | Barksby et al. | |
| 5,864,001 A | 1/1999 | Masse et al. | |
| 6,588,511 B1 | 7/2003 | Kriesel et al. | |
| 6,673,409 B1 | 1/2004 | Wheatley | |
| 6,896,065 B2 | 5/2005 | Kriesel et al. | |
| 7,041,719 B2 * | 5/2006 | Kriesel | C08K 5/57 524/114 |
| 7,125,602 B2 | 10/2006 | Wheatley | |
| 7,252,867 B2 | 8/2007 | Wheatley | |
| 7,910,188 B2 | 3/2011 | Wheatley | |
| 7,923,088 B2 | 4/2011 | Wheatley | |
| 8,110,269 B2 | 2/2012 | Wheatley | |
| 8,110,270 B2 | 2/2012 | Wheatley | |
| 8,302,213 B2 | 11/2012 | Kriesel | |
| 9,974,342 B1 * | 5/2018 | Kriesel | A41D 13/0562 |
| D880,950 S | 4/2020 | Kriesel et al. | |
| 10,681,830 B1 * | 6/2020 | Goodenough | G06F 1/203 |
| 10,717,582 B1 * | 7/2020 | Goodenough | B65D 81/022 |
| 10,807,767 B1 * | 10/2020 | Kriesel | C09J 4/00 |
| D902,584 S | 11/2020 | Kriesel et al. | |
| 10,914,087 B1 * | 2/2021 | Kriesel | E04G 23/0214 |
| D921,401 S | 6/2021 | Kriesel et al. | |
| 11,046,482 B1 * | 6/2021 | Kriesel | C09D 175/08 |
| 11,051,676 B1 * | 7/2021 | Kriesel | C09D 175/08 |
| 11,124,596 B2 * | 9/2021 | Kriesel | C08G 59/1472 |
| 11,142,373 B1 * | 10/2021 | Kriesel | C08G 18/7671 |
| 11,155,671 B1 * | 10/2021 | Kriesel | C09J 4/00 |
| 11,225,358 B2 * | 1/2022 | Kriesel | B05D 1/02 |
| D944,525 S | 3/2022 | Kriesel et al. | |
| 11,326,016 B1 * | 5/2022 | Kriesel | C08G 18/7671 |
| 11,377,259 B1 * | 7/2022 | Kriesel | A61B 50/33 |
| 11,505,956 B1 * | 11/2022 | Kriesel | E04G 23/0285 |
| 11,932,720 B1 * | 3/2024 | Kriesel | C08G 18/7671 |
| 2004/0191446 A1 | 9/2004 | Kriesel | |
| 2004/0200623 A1 | 10/2004 | Kriesel | |
| 2006/0272367 A1 | 12/2006 | Kriesel | |
| 2006/0287147 A1 | 12/2006 | Kriesel | |
| 2008/0005929 A1 | 1/2008 | Hardy et al. | |
| 2008/0026658 A1 | 1/2008 | Kriesel | |
| 2008/0250729 A1 | 10/2008 | Kriesel | |
| 2009/0042676 A1 | 2/2009 | Kriesel | |
| 2010/0170139 A1 | 7/2010 | Zhou | |
| 2012/0222457 A1 | 9/2012 | Kriesel et al. | |
| 2013/0288060 A1 | 10/2013 | Pind et al. | |
| 2013/0296449 A1 | 11/2013 | Peterson et al. | |
| 2015/0053583 A1 | 2/2015 | McCormick et al. | |
| 2020/0281681 A1 | 9/2020 | Glazer | |

* cited by examiner

*Primary Examiner* — Rabon A Sergent
(74) *Attorney, Agent, or Firm* — BRRLaw LLC; Bryan R. Rosiejka

(57) ABSTRACT

An inventive thermoset viscoelastomeric polymer and adhesive products thereof is provided. In some embodiments, an inventive adhesive product consists essentially of the thermoset viscoelastomeric polymer. In other embodiments, the thermoset viscoelastomeric polymer can be applied to a support member to provide an inventive adhesive product. In still other embodiments, the thermoset viscoelastomeric polymer can be applied to a conventional article to convert the article into an inventive adhesive product. The thermoset viscoelastomeric polymer and products thereof can comprise viscoelastic, adhesive, cohesive and releasability properties. In some embodiments, the thermoset viscoelastomeric polymer and products thereof can comprise cleansability and reusability properties. In further embodiments, the thermoset viscoelastomeric polymer and products thereof can comprise antimicrobial properties.

29 Claims, 12 Drawing Sheets

THERMOSET VISCOELASTOMERIC POLYMER AND PRODUCTS THEREOF

CROSS-REFERENCE TO RELATED APPLICATION

This application is a Continuation-In-Part of, and claims priority to, U.S. Nonprovisional application Ser. No. 15/731,815 filed Aug. 7, 2017, which is a Continuation-In-Part of U.S. Nonprovisional application Ser. No. 14/999,722 filed Jun. 20, 2016, which is a Nonprovisional application claiming the priority benefit of U.S. Provisional Application No. 62/231,004 filed Jun. 22, 2015, all of which applications are incorporated herein by reference in their entirety.

TECHNICAL FIELD

The present disclosure relates to an inventive thermoset viscoelastomeric polymer and adhesive products thereof. In some more particular embodiments, such polymer further comprises adhesive and cohesive properties.

BACKGROUND

Adhesive products can be useful for adhering objects, such as a first object to a second object, wherein the adhesive product serves as an adhesive intermediary between the first object and second object. Conventional adhesive products for such use can include double-sided adhesive tape, glue compositions (e.g., contact cement), and the like. However, such conventional adhesive products typically lack adequate cohesiveness. For example, when one object is removed from the other, the characteristics (e.g., shape, surface topography, internal bonding, etc.) of the conventional adhesive products (particularly of the adhesive composition component) permanently alter, typically resulting in a diminished effectiveness (e.g., reduced adhesiveness) thereafter. In addition, many conventional adhesive products will undesirably leave visually observable adhesive composition upon the surface of a removed object. Thus, there is a need for an adhesive product having an improved cohesiveness. There is also a need for an adhesive product wherein the characteristics do not permanently change upon removal of an object therefrom. There is a further need for an adhesive product wherein the adhesiveness remains effective and/or consistent despite removal of an object therefrom. There is an additional need for an adhesive product which leaves no more than a trace amount, and preferably no amount, of visually observable adhesive composition upon an object removed therefrom.

In addition, most conventional adhesive products comprising adhesive compositions are intended for relatively permanent attachment of a first object to a second object. However, there are many circumstances wherein a user desires to remove an object from an adhesive product without degradation of the object. Accordingly, there is a need for an adhesive product which can suitably stabilize (i.e., prevent movement of) an object attached thereto, and which further allows for removal of the object from the adhesive product substantially without degradation of the object.

In addition, most conventional adhesive products comprising adhesive compositions are intended for a single use, thus resulting in discarding the adhesive product thereafter. Such single use products are not environmentally friendly. Some users may attempt to re-use a conventional adhesive product after its first use, but will typically find its effectiveness to be greatly diminished with each subsequent use. Accordingly, there is a need for an adhesive product which can be re-used multiple times without exhibiting any substantial degradation in its effectiveness properties (e.g., adhesiveness, cohesiveness, etc.).

In addition, when exposed to the environment, most conventional adhesive products comprising adhesive compositions will tend to accumulate airborne contaminants (e.g., dust, lint, debris, etc.) which reduces the available adhesive surface area, and thus reduces the adhesiveness of such products. In the case where a conventional adhesive product is intended to attract contaminants (e.g., an adhesive lint roller), the conventional products (or portions thereof) must be discarded due to such contaminant accumulation (i.e., ineffective adhesiveness). Accordingly, there is a need for an adhesive product which is cleansable, such as with water or a water/detergent solution, such that the contaminants can be removed and the original adhesiveness of the product is substantially restored.

In addition, most conventional adhesive products comprising adhesive compositions are not antimicrobial. Indeed, most conventional adhesive products tend to attract microbes, which can cause the conventional adhesive products to be non-hygienic, and possibly even a health threat. Accordingly, there a need for an adhesive product that is additionally antimicrobial.

SUMMARY

In response, the inventive adhesive and cohesive thermoset viscoelastomeric polymer of the present disclosure and products thereof solve one or more of the problems and/or needs discussed above.

In some preferred embodiments, a thermoset viscoelastomeric polymer derived from a thermosetting reaction media comprises about 2 wt % to about 10 wt % isocyanate prepolymer, about 35 wt % to about 75 wt % polyols, and about 10 wt % to about 60 wt % plasticizer. Preferably, the polyols comprise about 1 wt % to about 65 wt % of the total reaction media weight straight chain diol and about 3 wt % to about 50 wt % of the total reaction media weight crosslinking polyol. Preferably, the plasticizer comprises about 10 wt % to less than 50 wt % of the total reaction media weight epoxidized triglyceride plasticizer and about 0 wt % to about 40 wt % of the total reaction media weight viscosity reducing plasticizer.

In some aspects of this embodiment, the isocyanate prepolymer comprises a diisocyanate. In other aspects of this embodiment, the straight chain diol and the crosslinking polyol each have a molecular weight of about 1,000 to about 20,000. In still other aspects of this embodiment, the crosslinking polyol comprises triol. In some further aspects, the diol comprises polyether diol and the triol comprises polyether triol. In yet other aspects of this embodiment, the thermoset viscoelastomeric polymer further comprises a straight chain diol to crosslinking polyol weight ratio of about 1:3 to about 3:1.

In some aspects of this embodiment, the plasticizer comprises about 10 wt % to less than about 45 wt % of the total reaction media weight epoxidized triglyceride plasticizer. In other aspects of this embodiment, the epoxidized triglyceride plasticizer comprises an epoxidized vegetable oil. In still other aspects of this embodiment, the viscosity reducing plasticizer is an ester plasticizer. In some further aspects, the ester plasticizer is selected from the group consisting of sebacates, adipates, phthalates, isophthalates, maleates, azelates and glutarates. In yet other aspects of this embodiment, the viscosity reducing plasticizer has a molecular weight of less than about 750. In still other aspects of this embodiment, the viscosity reducing plasticizer has a dipole moment of at least about 1.5 D. In yet other aspects of this embodiment, the thermoset viscoelastomeric polymer further comprises an epoxidized triglyceride plasticizer to viscosity reducing plasticizer weight ratio of about 6:1 to about 1:3.

In some aspects of this embodiment, the thermoset viscoelastomeric polymer comprises an adhesiveness of about 100 $g_f/cm^2$ to about 2,500 $g_f/cm^2$ as measured by the Adhesiveness and Cohesiveness Test. In other aspects of this embodiment, the thermoset viscoelastomeric polymer is in the form of a standalone adhesive product. In still other aspects of this embodiment, the thermoset viscoelastomeric polymer is disposed upon a support member to form an adhesive product. In yet other aspects of this embodiment, the thermoset viscoelastomeric polymer is disposed upon a conventional article to form an adhesive product.

In some preferred embodiments, an adhesive product comprises an adhesive and cohesive thermoset viscoelastomeric polymer and a support member, wherein the polymer is disposed upon, or at least partially into, the support member.

In some aspects of this embodiment, an item disposed upon the adhesive product is substantially prevented from movement thereupon. In other aspects of this embodiment, the adhesive product comprises releasability properties such that an item adhered to the adhesive product can be removed upon application of a sufficient removal force without detachment of the polymer from the support member. In still other aspects of this embodiment, the adhesive product comprises cleansability and reusability properties, wherein a contaminant adhered to the adhesive product can be removed therefrom via washing with water, and wherein an adhesiveness of the adhesive product substantially returns to its original state upon fully drying. In yet other aspects of this embodiment, the adhesive product comprises antimicrobial properties.

In some aspects of this embodiment, the support member is a rigid material. In other aspects of this embodiment, the support member is a flexible material. In still other aspects of this embodiment, the support member is provided by a non-adhesive article.

In some aspects of this embodiment, the adhesive and cohesive thermoset viscoelastomeric polymer is prepared by a thermosetting reaction media comprising about 2 wt % to about 10 wt % isocyanate prepolymer, about 35 wt % to about 75 wt % polyols, and about 10 wt % to about 60 wt % plasticizer. Preferably, the polyols comprise about 1 wt % to about 65 wt % of the total reaction media weight straight chain diol and about 3 wt % to about 50 wt % of the total reaction media weight crosslinking triol. Preferably, the plasticizer comprises about 10 wt % to less than about 45 wt % of the total reaction media weight epoxidized triglyceride plasticizer and 0 wt % to about 40 wt % of the total reaction media weight ester plasticizer. In some further aspects, the isocyanate prepolymer is a diisocyanate prepolymer. In other further aspects, the epoxidized triglyceride plasticizer is epoxidized soybean oil. In still other further aspects, the ester plasticizer is dibutyl sebacate.

Numerous other features and advantages of the present invention will appear from the following description. In the description, reference is made to exemplary embodiments of the invention. Such embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

FIGURES

The foregoing and other features, aspects and advantages of the present invention will become better understood with regard to the following description, appended claims and accompanying drawings where:

Figure 1A:
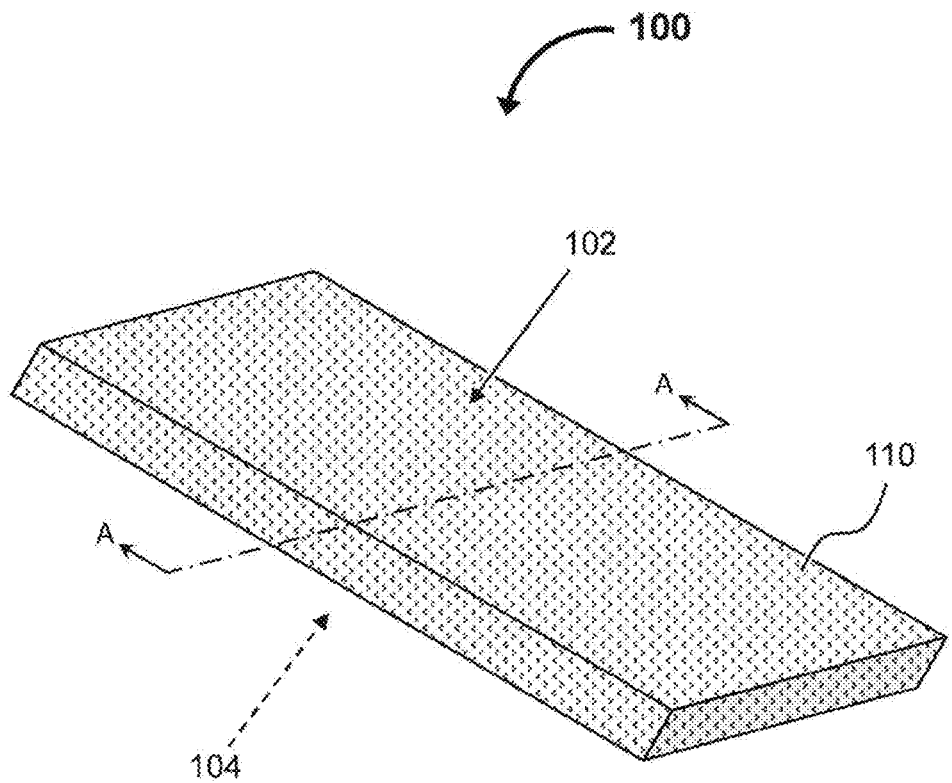
FIG. 1A is a perspective view showing a non-limiting exemplary embodiment of an inventive adhesive product of the present disclosure in the form of a standalone adhesive pad.
Figure 1B:
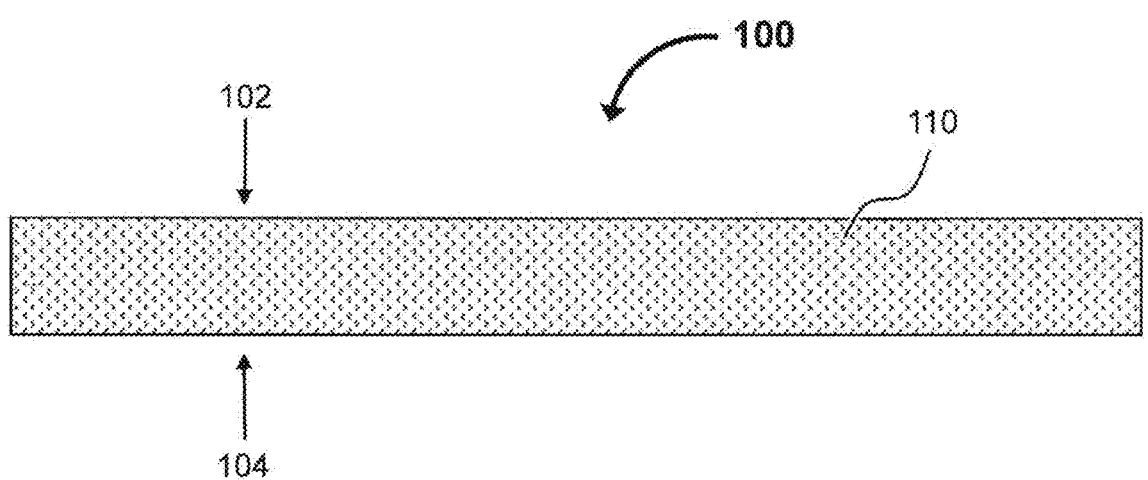
FIG. 1B is a side view of the inventive adhesive product of FIG. 1A taken along line A-A.

Repeated use of reference characters in the present specification and drawings is intended to represent the same or analogous features or elements of the present invention. It should be understood that the drawings herein are not intended to be drawn to scale, but rather are drawn to show particular elements of the invention.

Test Methods

Adhesiveness & Cohesiveness Test

Figure 15:
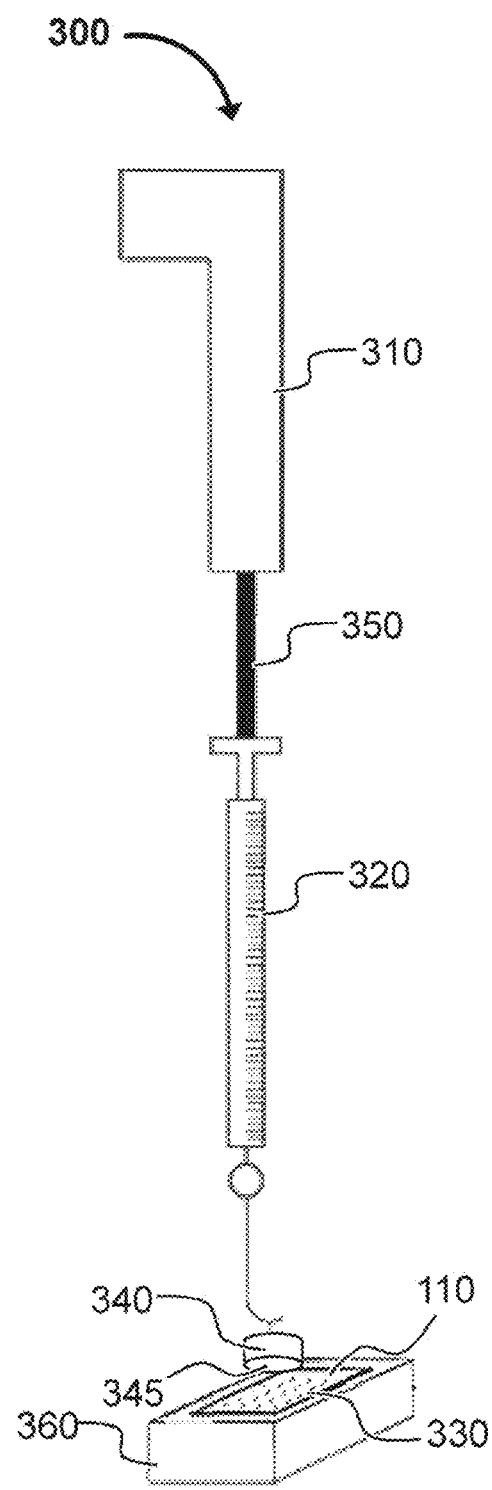
FIG. 15 is a front perspective view showing a testing apparatus for the Adhesiveness & Cohesiveness Test.

Referring to FIG. 15, the illustrated testing apparatus 300 can be utilized for testing the adhesiveness, cohesiveness and releasability properties of various different thermoset viscoelastomeric polymers 110 of the present invention. The test apparatus 300 includes a motor driven actuator 310 (similar in concept to that of a standard remote controlled electric garage door opener, such as a Model 3265, available from The Chamberlain Group, Inc., having a place of business located in Elmhurst, Illinois 60126, U.S.A.) or equivalent. The actuator 310 includes a reversible constant speed motor (2.7 cm/sec which is occluded from view) serving to drive a remotely controlled reciprocating test probe 350 connected to a measuring scale 320 to measure adhesiveness, which is the amount of applied force (in grams-force) needed to separate each polymer 110 test sample 330 from a polished nickel cylinder 340 weighing 20.0 grams and having a contact surface area 345 of 1.76 cm$^2$, thus providing measurements in units of grams-force per square centimeter (g$_f$/cm$^2$). A testing platform 360 of a laterally movable form is utilized to provide a solid, flat and level surface which allows for repositioning of the test sample 330 to provide an accurate repetition of the test results for each tested sample. Such testing platform 360 should be of a sufficient weight such that it does not lift from the surface during testing. The testing platform 360 may thus be repositioned to provide a repetition of an untested portion of the test sample 330 for further testing. Accordingly, adhesiveness is measured as the average of ten (10) repetitions upon untested portions of a single polymer 110 test sample 330.

The testing procedure is also useful for determining the cohesiveness of the thermoset viscoelastomeric polymer 110 test sample 330. This is accomplished by observing and noting the presence or absence of polymeric residue from each polymer 110 test sample 330 upon the test cylinder surface 345 after separating the cylinder 340 from the test sample 330 via the test procedure. The cylinder surface 345 should be cleaned of any residue between each repetition, and the cohesiveness is measured as the average amount of residue over ten (10) repetitions upon untested portions of a single test sample 330.

In addition, additional testing can include the application of pressure to the cylinder 340 when in contact with a polymer 110 test sample 330. By measuring the adhesiveness and cohesiveness of each test sample 330 under differently applied sample application pressures, the adhesive and cohesive effects from applying such different pressures can likewise be determined.

Similarly, adhesiveness changes measured over timed sequence intervals can also be determined so as to provide adhesive data upon a polymer 110 test sample's 330 adhesiveness stability. The test procedure can also be utilized to provide adhesiveness data upon short interval adhesiveness increases following an initial adhesive attachment of the cylinder surface 345 to the test sample 330. Differences in adhesiveness between pressure and non-pressure applied test probe over timed intervals can also be determined.

Figure 3:
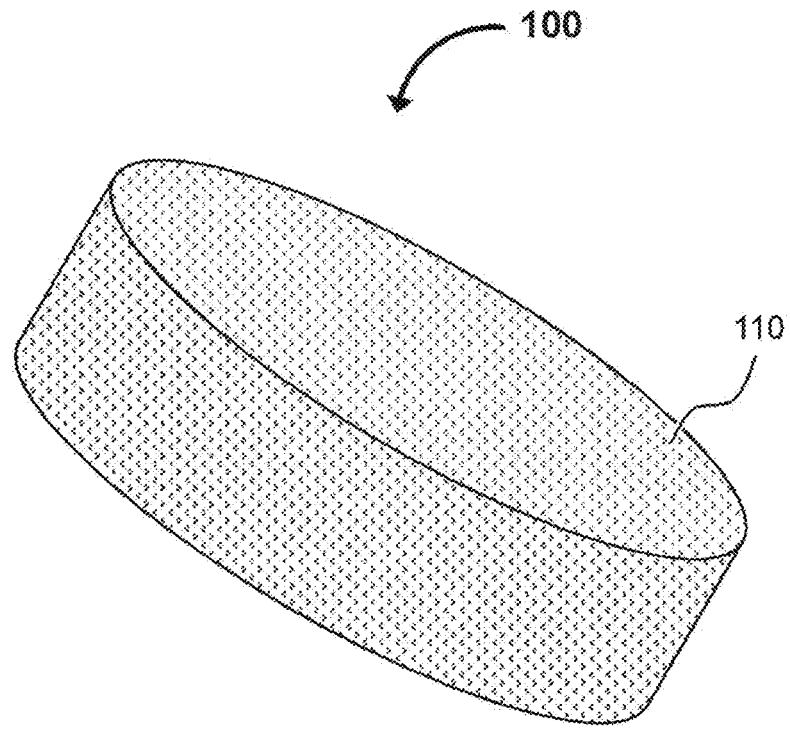
FIG. 3 is a perspective view showing a non-limiting exemplary embodiment of an inventive adhesive product of the present disclosure in the form of a standalone adhesive pad.
Figure 4:
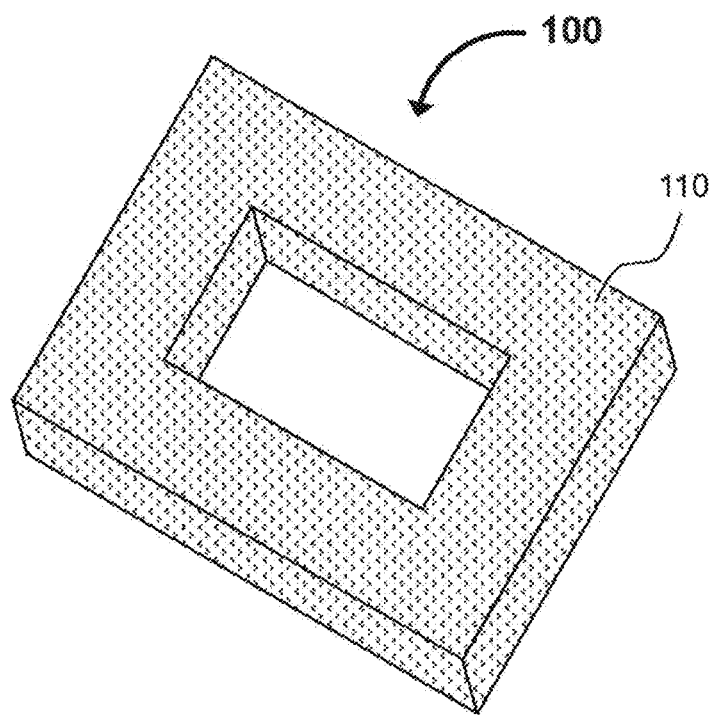
FIG. 4 is a perspective view showing a non-limiting exemplary embodiment of an inventive adhesive product of the present disclosure in the form of a standalone adhesive pad.
Figure 5:
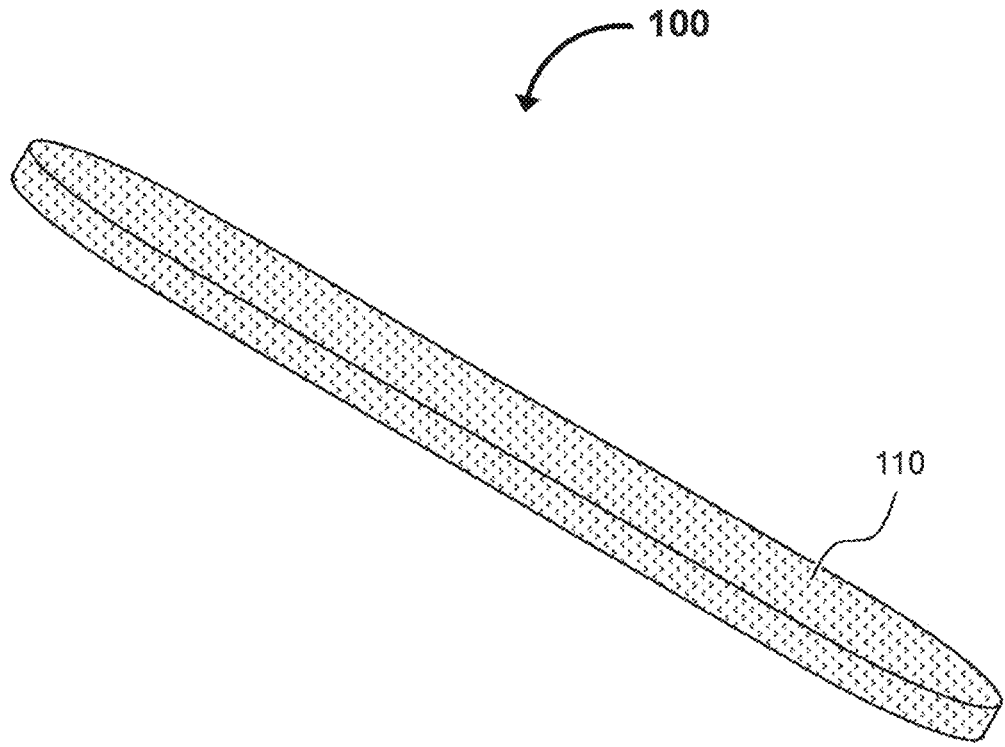
FIG. 5 is a perspective view showing a non-limiting exemplary embodiment of an inventive adhesive product of the present disclosure in the form of a standalone adhesive strip.
Figure 6:
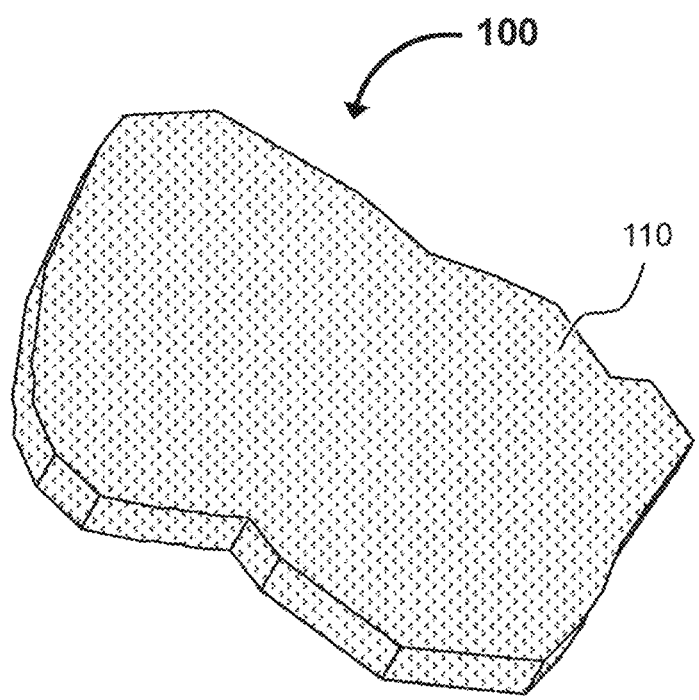
FIG. 6 is a perspective view showing a non-limiting exemplary embodiment of an inventive adhesive product of the present disclosure in the form of a standalone adhesive pad.
Figure 7A:
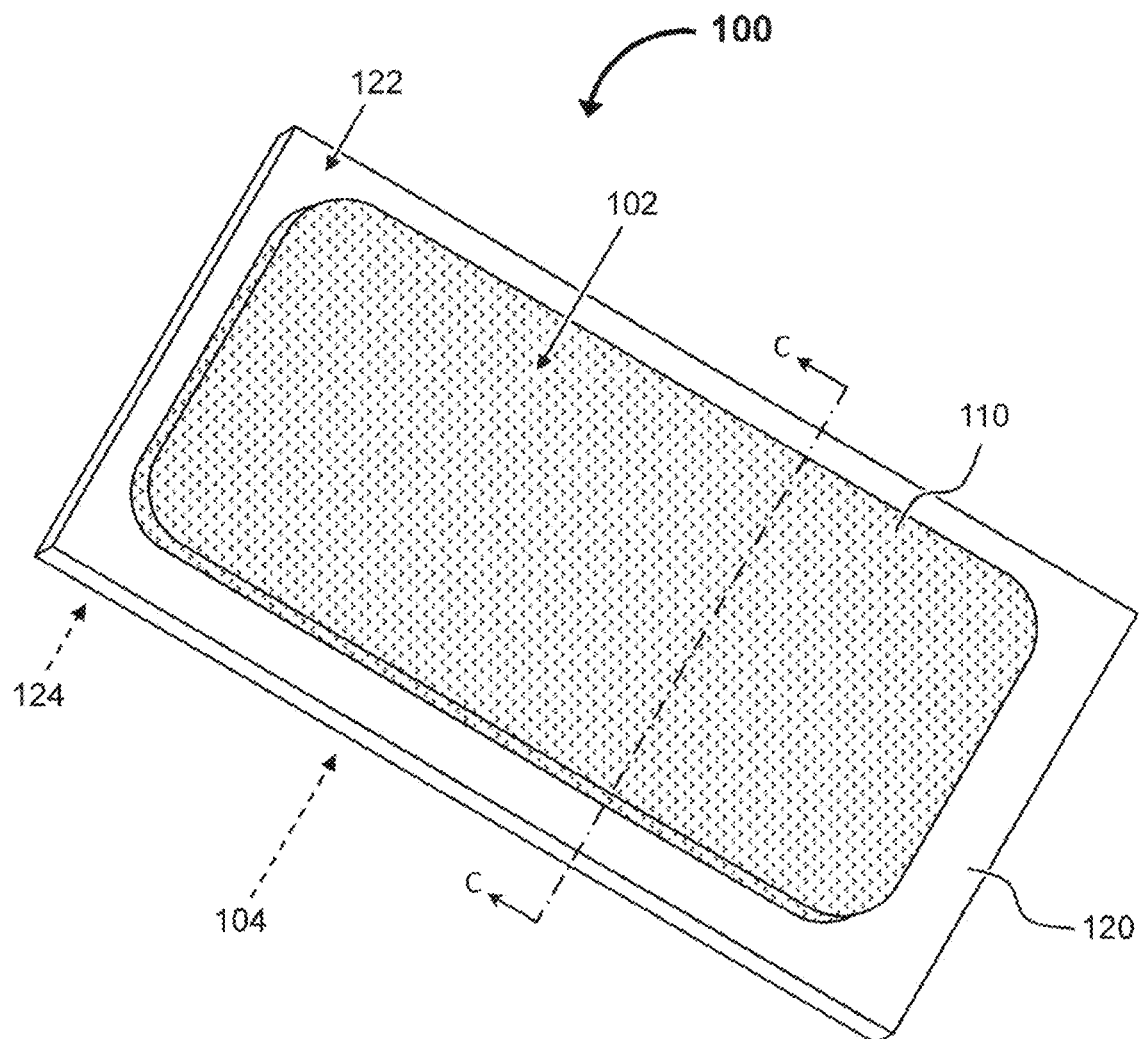
FIG. 7A is a perspective view showing a non-limiting exemplary embodiment of an inventive adhesive product of the present disclosure comprising a rigid support member.
Figure 7B:
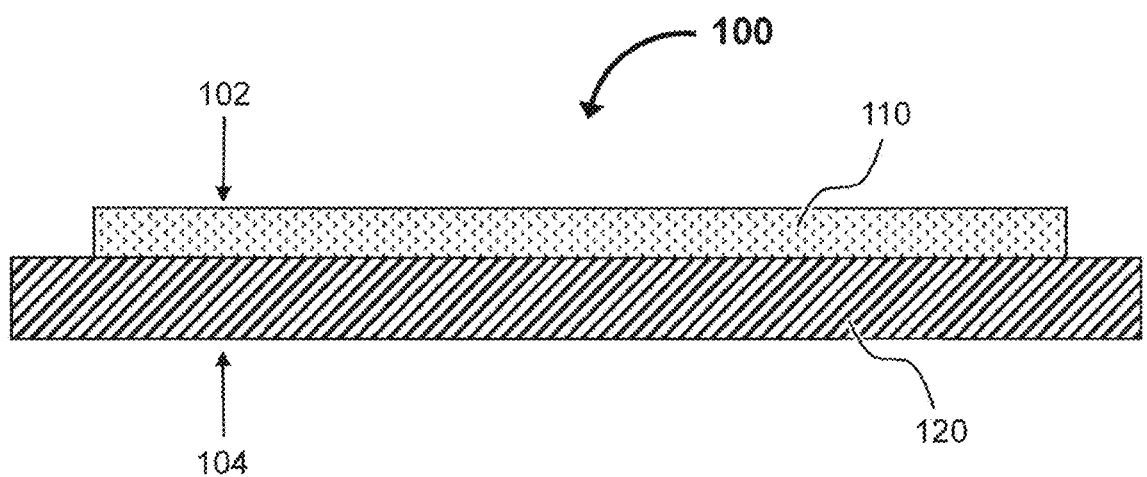
FIG. 7B is a side view of the inventive adhesive product of FIG. 7A taken along line C-C.

Continuing with FIG. 15, the following more detailed methodology can be used to test the adhesiveness and cohesiveness of various polymer 110 test samples 330:

1. Scope
    1.1. This method measures the level of tackiness (adhesiveness) exhibited by adhesive materials and the cohesiveness of such materials, optionally taking into account time dependent and/or pressure dependent adhesiveness properties.
    1.2. This test is designed for use with materials that exhibit adhesive properties, but may also be used with materials not explicitly classified as adhesives, including but not limited to materials having adhesive-like properties.
    1.3. Units—The tested values of adhesiveness are based upon grams-force per square centimeter (g$_f$/cm$^2$) of the force needed to separate the surface 345 of a polished nickel cylinder 340 having a contact surface area of 1.76 cm$^2$ from the test sample 330.
2. Terminology
    2.1. As used herein, the term "adhesive-like" refers to having a sticky quality akin to an adhesive, but derives its sticky quality from molecular structure that forms a molecular attraction (e.g., rather than chemical bonded properties) which is releasable from adhered objects.
    2.2. As used herein, the term "tackiness" refers to the adhesiveness quality of feeling sticky to the touch.
    2.3. As used herein, the term "time dependent adhesive" refers to a material in which adhesive strength changes according to duration of the contact time with a contacting surface.
    2.4. As used herein, the term "pressure sensitive adhesives" refers to a material wherein additional external pressure is required to achieve a change in adhesiveness after initial contact.
3. Summary of Test Method Using the Testing Apparatus Depicted in FIG. 15
    3.1. A thermoset viscoelastomeric polymer 110 test sample 330 is placed upon the top side planar surface of the testing platform 360.

3.2. The testing probe 350 of the apparatus 300 is lowered to place the surface 345 of the cylinder 340 onto the test sample 330.

3.3. The surface 345 of the cylinder 340 of the apparatus 300 remains in contact with the polymer 110 test sample 330 for a designated time period.

3.4. The cylinder 340 of the apparatus 300 is then raised from the test sample 330 via the reciprocating probe 350 at a constant speed of 2.7 cm/sec to measure the force in grams required to completely separate the cylinder surface 345 from the test sample 330, as indicated by the measuring scale 320.

3.5. The measured separating force (adhesiveness) is then calculated and recorded in units of $g_f/cm^2$. In addition, the contacting surface 345 of the cylinder 340 is observed and the amount (e.g., the weight) of residue attached thereto (if any) is recorded to determine cohesiveness. (Note: the surface 345 should be cleaned if residue is present prior to further testing.)

3.6. Steps 3.1-3.5 are then repeated on untested portions of the sample 330 so as to obtain a total of ten (10) tests per sample, which are then averaged to yield a final result.

3.7. Optionally, steps 3.1-3.6 can then be repeated over designated contact time intervals so as to determine the time dependent properties of the test sample 330.

3.8. Optionally, steps 3.1-3.6 can then be repeated over designated applied pressures so as to determine the pressure dependent properties of the test sample 730.

4. Apparatus 4.1. The testing apparatus 300 is illustrated in FIG. 15. Alternative materials and configurations to those stipulated may be utilized as long as they achieve comparable performance and meet the performance stipulations outlined in Section 4.2 below. Key elements of the apparatus include:

4.1.1. A reciprocating mobile actuator 350, which is responsible for lowering and raising the cylinder 340 onto the material sample 330 at a constant speed of 2.7 cm/sec.

4.1.2. The scale 320, which measures the amount of force in grams required to separate the contact surface 345 of the cylinder 340 from the test sample 330.

4.1.3. The contact surface 345 of the cylinder 340, which is the sole contacting surface with the test sample 330. The contact surface 345 of the cylinder 340 is a circular polished nickel surface having a total contact surface area of 1.76 cm².

4.1.4. The testing platform 360, which provides a solid, level surface for accurate test results and secures the adhesive polymer 110 test sample 330 for testing. This platform 360 is laterally movable so as to allow for repositioning of the test sample 330 for multiple testing.

4.2. Regardless of the specific components used:

4.2.1. The mobile actuator (test probe) 350 must raise and lower the cylinder 340 at a constant speed of 2.70 cm/second.

4.2.2. The accuracy of the test, the testing apparatus 300 and scale 320 must measure force in grams with an accuracy resolution of five-percent (5%) or better.

4.2.3. Except for optional pressure applied tests, a constant pressure of 20.0 grams for the duration of the test must be applied by the free-hanging, weighted cylinder 340.

4.3. The test procedure is conducted at ambient temperatures of 18° C. to 24° C. and most preferably at 21° C.

5. Calibration 5.1. Prior to first use and at subsequent reasonable testing intervals afterwards, the speed rate of the actuator 350 is verified (and adjusted as needed) to ensure consistency within the standard outlined in Section 4.2.1.

5.2. Prior to first use, the accuracy of the scale 320 should be verified against a known weight and adjusted or zeroed accordingly.

6. Procedure 6.1. Assemble the testing apparatus 300.

6.2. Place a polymer 110 test sample 330 of material to be tested upon the top side planar surface of the testing platform 360, ensuring that the platform 360 does not lift free during testing.

6.3. Lower the testing cylinder 340 onto the test sample 330, ensuring even contact between the contact surface 345 and the test sample 330, and ensuring the testing scale 350 is neither pulling nor applying pressure to the cylinder 340.

6.4. Allow the surface 345 of the cylinder 340 to remain in contact with the test sample 330 for 15 seconds or for the duration of another predetermined contact period.

6.5. Continue the test by raising the surface 345 of the cylinder 340 from the test sample 330.

6.6. Record the amount of gram-force as measured by the scale 350 needed to separate the surface 345 of the cylinder 340 from the test sample 330.

6.7. Clean the surface 345 of the cylinder 340 after each iteration with a lint free cloth.

6.8. Reset the scale 350.

6.9. Reposition the testing platform 360 such that a fresh (untested) area of the test sample 330 is tested by the apparatus 300.

6.10. Repeat steps 6.2-6.9 to obtain a total of ten (10) measurements.

6.11. Optionally repeat steps 6.2-6.10 for each duration of testing to determine time dependent properties (e.g., at timed intervals 15 seconds, 30 seconds, 5 minutes, 10 minutes and 15 minutes).

6.12. Optionally repeat steps 6.2-6.10 for each duration of testing to determine pressure dependent properties (by applying incremental predetermined pressures to the cylinder 340).

7. Calculation and Interpretation of Results 7.1. Calculate the adhesiveness for each of the ten (10) test sample 330 measurements by dividing the force ($g_f$) required for the surface 345 of the cylinder 340 to completely detach from the test sample 330 by the contact surface area 345 of the cylinder 740 (1.76 cm²), and then calculate the average of the ten (10) adhesiveness measurements to establish a final adhesiveness value. The average tested value is given in the amount of gram-force per square centimeter ($g_f/cm^2$) representing the required force to separate the surface 345 of the cylinder 340 from the polymer 110 test sample 330, which serves as a measurement of adhesiveness.

7.2. Calculate the cohesiveness for each of the ten (10) observed residue quantities, and then calculate the average of the ten (10) quantities to establish a final cohesiveness value. A lower cohesiveness value can be more desirable than a higher value (e.g., wherein a lower value indicates less residue transferred to the contacting surface 345 of the cylinder 340 (i.e., better cohesiveness) than a higher value).

7.3. Repeat steps 7.1 and 7.2 for all iterations tested.

Time Sensitivity Test

An uncured admixture (such as prepared in accordance with Examples below) is spread evenly at a uniform four (4) mm thickness upon a polyvinyl chloride (PVC) apron and allowed to cure into a desired thermoset viscoelastomeric polymer 110. The resulting polymer 110 is then cut into suitable test sample 330 sizes for testing using the testing apparatus 300 depicted in FIG. 15, with the testing procedure being conducted in accordance with the Adhesiveness & Cohesiveness Test procedure set forth above, and further performing the optional time dependent properties procedures set forth therein.

Peel Test

Adhesiveness, cohesiveness and releasability properties can be measured using the test method described in Appendix A of the aforementioned cross-referenced related applications. Such properties can also be measured using standardized test methods known to persons having skill in the art, such as ASTM D1876 Peel Resistance of Adhesives (T-Peel Test), as well as other standardized Peel Tests such as the ASTM 90-Degree Test and ASTM 180-Degree Test, which are used when a flexible material has been bonded to a rigid substrate such as plastic or metal, as well as equivalent tests thereof.

Flexibility Test

The flexibility of a polymer 110 component or an adhesive product 100 herein can be tested in accordance with ASTM D4338-97(2021) or equivalent.

Tensile Test

The tensile of the polymer 110 component herein can be tested in accordance with ASTM D3039/D3039M-17 or equivalent.

Definitions

It should be noted that, when employed in the present disclosure, the terms "a" and "an" are intended to mean "at least one" of any stated features, elements, integers, steps, components, or groups and are not intended to be limited to only one of such features, elements, integers, steps, components, or groups thereof, except where specifically stated as such. In addition, use of the phrase "at least one" is not intended to render other uses of the terms "a" or "an" to be limited to only one of a feature, element, integer, step, component, or group.

It should be noted that, when employed in the present disclosure, the terms "comprises," "comprising" and other derivatives from the root term "comprise" are intended to be open ended terms that specify the presence of any stated features, elements, integers, steps, components, or groups, and are not intended to preclude the presence or addition of one or more other features, elements, integers, steps, components, or groups thereof.

As used herein, the terms "adhesive" and "adhesiveness" refer to the bonding strength or adhesive release strength of the thermoset viscoelastomeric polymer of the present disclosure and products thereof to an object. The polymer possesses an unexpectedly powerful adhesiveness from which an item can be released by applying a counteracting force to overcome the polymer's adhesiveness. Adhesiveness can be measured, inter alia, by the Adhesiveness and Cohesiveness Test set forth herein.

As used herein, the term "catalytic amount" is a term of the art which is recognized by persons having ordinary skill in the art and refers to an amount that is enough to obtain a desired response or result.

As used herein, the terms "cohesive" and "cohesiveness" refer to the ability of the thermoset viscoelastomeric polymer of the present disclosure and products thereof to retain its structural integrity when subjected to separating or peeling forces. Cohesiveness can be measured, inter alia, by the Adhesiveness & Cohesiveness Test set forth herein. The cohesive attributes can be further reflected by the separation of an item attached to the polymer component without leaving substantially any polymeric residue upon the surface of the item and by the polymer component's ability to return to its original innate form upon removal of an item attached thereto as prior to attachment of the item.

As used herein, the term "reaction media" refers to a mixture of chemical constituents which, upon curing, forms the inventive polymer of the present disclosure.

As used herein with respect to the inventive polymer of the present disclosure and products thereof, the terms "releasable" and "releasability" refer to the setting free from restraint or disengagement of an item from the polymer component.

As used herein, the terms "viscoelastomeric" and "viscoelastic" can be used interchangeably to refer to a substance having viscous, elastic and flow properties.

These terms may be defined with additional language in the remaining portions of the specification.

DETAILED DESCRIPTION

The invention is generally directed to an inventive adhesive and cohesive thermoset viscoelastomeric polymer (which may also be referred to herein as a "viscoelastomer") and its use in adhesive products. In some embodiments, the inventive adhesive products consist essentially of the inventive polymer. In other embodiments, the inventive adhesive products comprise the inventive polymer and a support member. In still other embodiments, the inventive adhesive products comprise the inventive polymer and a conventional article.

The inventive thermoset viscoelastomeric polymer and adhesive products thereof of the present disclosure can comprise a number of unique features. For example, in preferred embodiments, the inventive polymer (in its cured form) is viscoelastic (also referred to herein as "viscoelastomeric"). Accordingly, the inventive polymer tends to be relatively flexible. In addition, the inventive polymer does not compress in the manner of a foam product, for example, but rather exhibits fluidic properties when a pressing force is applied thereto.

In preferred embodiments, the inventive polymer and products thereof also comprise adhesiveness, preferably releasable adhesiveness, such that an item adhered to the polymer component of an inventive adhesive product can also be removed therefrom (via application of a sufficient removal force to overcome the adhesive force of the polymer component), desirably without damaging or degrading the item. The degree of adhesiveness of the polymer component and products thereof can be adjusted within a given adhesiveness range via manipulation of certain constituents of the inventive polymer within prescribed ranges (discussed further below). For example, the degree of adhesiveness for adhering and stabilizing relatively fragile items or for forming a seal between human skin and the inventive polymer would desirably be relatively low within the adhesiveness range, whereas the degree of adhesiveness for adhering and stabilizing a large or heavy item, such as a heavy-hammer, would desirably be comparatively higher within the adhesiveness range.

In preferred embodiments, the inventive polymer (in its cured form) further comprises cohesiveness. Such cohesiveness substantially prevents separation of the inventive polymer from itself (i.e., transference of polymer to an item) upon removal of items attached thereto. Accordingly, the inventive polymer leaves no more than a trace amount, more preferably no amount, of visually observable residual polymer upon an item after coming into contact with the polymer component of an inventive adhesive product herein. In other words, the total amount of polymer by weight of the polymer component remains substantially constant over time, including after multiple uses. In addition, the unique cohesiveness of the inventive polymer allows the polymer component to substantially return to its original innate form. Accordingly, the inventive polymer will substantially return to the same overall shape profile the polymer had upon curing, despite any deformation of the polymer during use, such as due to the application of external forces (e.g., pressing an item into the polymer, pulling an item away from the polymer, peeling the polymer from a surface, stretching the polymer, etc.).

In some preferred embodiments, the inventive polymer (in its cured form) comprises substantially no volatile organic compounds (VOC's). Thus, the total amount of polymer by weight of the polymer component remains substantially constant over time. Accordingly, the inventive polymer of such embodiments is environmentally friendly.

In some preferred embodiments, the inventive polymer (in its cured form) is cleansable (also referred to herein as "washable"), and thus reusable over time. Desirably, such cleansing of the inventive polymer and adhesive products thereof can be accomplished by washing with water, or with a solution of water and a detergent (e.g., a solution of tap water and DAWN dish detergent, available from Procter & Gamble Company, having a place of business located in Cincinnati, Ohio, USA). Such cleansing typically results in a substantial return to the inventive polymer's original adhesiveness. Accordingly, the inventive polymer and adhesive products thereof can be utilized for multiple uses over time while substantially providing optimal effectiveness for each such use.

In some preferred embodiments, the inventive polymer (in its cured form) is antimicrobial (including antibacterial, antifungal and antipathogenic). Accordingly, the polymer can be ideal for uses involving hygienic and/or sanitary conditions, including food, health and medical uses (e.g., hygienic containers, medical trays, surgical drapes, etc.). Preferably, such antimicrobial properties remain optimally effective throughout multiple uses of the polymer and the products thereof.

The inventive thermoset viscoelastomeric polymer of the present disclosure can typically be formed via the preparation and subsequent curing of a thermosetting reaction media. In some preferred embodiments, the reaction media comprises (based on the total reaction media weight) about 2 percent by weight (wt %) to about 10 wt % isocyanate prepolymer, about 35 wt % to about 75 wt % polyols comprising about 1 wt % to about 65 wt % (based on the total reaction media weight) straight chain linking polyols and about 3 wt % to about 50 wt % (based on the total reaction media weight) crosslinking polyols, and about 10 wt % to about 60 wt % plasticizer comprising about 10 wt % to less than about 45 wt % (based on the total reaction media weight) epoxidized triglyceride plasticizer and about 0 wt % to about 40 wt % (based on the total reaction media weight) viscosity reducing plasticizer, preferably an ester plasticizer. Desirably, the inventive polymer is formed from a substantially uniform admixture of the reaction media constituents.

As referenced above, it has been discovered herein that the reaction media and the resulting polymer are substantially free from VOC's. It has been further discovered herein that the weight of the reaction media and the weight of the resulting polymer (i.e., upon curing the reaction media) remain substantially constant. Thus, the "wt %" values of each component referenced above can alternatively be expressed in terms of total "polymer" weight, without departing from the scope of the invention. Accordingly, in some preferred embodiments, the inventive polymer comprises (based on the total polymer weight) about 2 wt % to about 10 wt % isocyanate prepolymer, about 35 wt % to about 75 wt % polyols comprising about 1 wt % to about 65 wt % (based on the total polymer weight) straight chain linking polyols and about 3 wt % to about 50 wt % (based on the total polymer weight) crosslinking polyols, and about 10 wt % to about 60 wt % total plasticizer comprising about 10 wt % to less than about 45 wt % (based on the total polymer weight) epoxidized triglyceride plasticizer and about 0 wt % to about 40 wt % (based on the total polymer weight) viscosity reducing plasticizer, preferably an ester plasticizer. Of course, it should be understood that when expressing the components in terms of wt % based on total "polymer" weight, such components have actually been combined and reacted to form the polymer thereof. In the interest of brevity, the "wt %" of the polymer constituents will typically be expressed in terms of total reaction media weight herein.

In some embodiments, the straight chain polyols and the crosslinking polyols can each comprise repetitive oxygen groups. In other embodiments, the straight chain polyols and the crosslinking polyols can each comprise repetitive ether groups. In still other embodiments, the straight chain polyols and the crosslinking polyols can each comprise hydroxyl groups, desirably wherein two (2) of the hydroxyl groups are terminal hydroxyl groups. In some preferred embodiments, the straight chain polyols and the crosslinking polyols can each comprise a polyether having a molecular weight of about 1,000 to about 20,000. In some embodiments, the straight chain polyols and crosslinking polyols can be present in a straight chain polyol to crosslinking polyol weight ratio of about 1:3 to about 3:1.

In some preferred embodiments, the plasticizer is uniformly dispersed and cohesively bound throughout the interior portion of the inventive polymer. In some embodiments, the inventive polymer can comprise an epoxidized triglyceride plasticizer to viscosity reducing plasticizer weight ratio of about 6:1 to about 1:3.

The inventive adhesive and cohesive thermoset viscoelastomeric polymer is useful for, inter alia, providing unique inventive products, preferably adhesive products. For example, in some embodiments, such inventive products can consist essentially of the thermoset viscoelastomeric polymer of the present disclosure to form a standalone adhesive product. In other embodiments, the inventive products can comprise the polymer and a support member. In yet other embodiments, the inventive products can comprise the polymer and a conventional non-adhesive article (e.g., an existing consumer good). Accordingly, the inventive thermoset viscoelastomeric polymer of the present disclosure can further comprise additional components (e.g., substrates, electronics, etc.). Such inventive products can include, but are not limited to, containers, trays, rigid substrates, flexible substrates, clothing, hygienic items, medical items, cosmetics, lighting apparatus, fishing lures, floor mats, debris removers, mattresses, personal protective equipment, body attachments, and the like. It should be understood that the listing of such inventive products enumerated herein is intended to be exemplary and non-exhaustive, and indeed any goods that are compatible with the inventive adhesive and cohesive thermoset viscoelastomeric polymer of the present disclosure can be suitable to form inventive products of the present invention. Additional goods and uses which are also suitable to form inventive products of the present disclosure are described in U.S. Pat. No. 10,807,767 to Kriesel et al., U.S. Pat. No. 10,914,087 to Kriesel et al., U.S. Pat. No. 11,046,482 to Kriesel et al., U.S. Pat. No. 11,051,676 to Kriesel et al., U.S. patent application Ser. No. 15/731,815 to Kriesel et al., U.S. patent application Ser. No. 15/732,729 to Kriesel et al., U.S. patent application Ser. No. 15/932,829 to Kriesel et al., U.S. patent application Ser. No. 15/932,829 to Kriesel et al., U.S. patent application Ser. No. 16/280,849 to Kriesel et al., U.S. patent application Ser. No. 16/401,672 to Kriesel et al., U.S. patent application Ser. No. 16/678,917 to Kriesel et al. and U.S. patent application Ser. No. 16/864,665 to Kriesel et al., the contents of which are hereby incorporated herein by reference in a manner that is consistent herewith.

Although several exemplary embodiments of the present invention will be described herein, it should be understood that the disclosed embodiments are intended merely as non-limiting examples of the invention that may be embodied in various forms. Therefore, specific details disclosed herein, such as relating to structure, function, and the like, are not to be interpreted as limiting in any manner whatsoever, but rather only as one of numerous example bases for claims and/or teaching persons having ordinary skill in the art to variously employ the present invention in virtually any appropriately detailed structure or circumstance.

Accordingly, in the interest of brevity and conciseness, descriptions herein may be substantially directed to the non-limiting exemplary forms of the polymer as a stand-alone pre-formed (i.e., prefabricated) adhesive pad product, a product comprising the polymer and a support member, and a product comprising the polymer and a conventional non-adhesive article.

To gain a better understanding of the present invention, attention is directed to FIGS. 1A-15 for exemplary purposes relating to non-limiting exemplary inventive adhesive products 100 comprising the inventive thermoset viscoelastomeric polymer 110 of the present disclosure.

The thermoset viscoelastomeric polymer 110 of the present invention is particularly well suited for use with adhesive products 100, such as the non-limiting exemplary embodiments described herein. As referenced above, such unique polymer 110 can comprise an isocyanate prepolymer, polyols in the form of straight chain polyols (i.e., diols) and crosslinking polyols (i.e., triols or higher), and select plasticizers. The isocyanate prepolymer in combination with prescribed amounts of straight chain polyols and crosslinking polyols provides a thermoset infrastructure for effectively housing the plasticizer(s) in a form which unexpectedly contributes to the unique viscoelastomeric, cohesiveness, adhesiveness, releasability, cleansability, reusability and antimicrobial features of the polymer 110 and products 100 thereof. Furthermore, the unexpected cohesiveness attributes of the polymer 110 provides for a stabilized polymer providing for substantially no leakage (also referred to as "bleeding") of the relatively high plasticizer content (i.e., about 10 wt % or greater) from the polymer 110 component.

The inventive thermoset viscoelastomeric polymer 110 may be derived from a thermosetting reaction media comprised of a substantially uniform admixture of an isocyanate prepolymer, prescribed amounts of polyols (e.g., polyether diols and polyether triols) and a carefully controlled amount of select plasticizers. The isocyanate prepolymer in combination with a controlled amount of polyols in the form of straight chain diols and crosslinking polyols (preferably crosslinking triols) provides a thermoset infrastructure for effectively housing the plasticizing components in a form which unexpectedly contributes to the unique stabilized, viscoelastic, adhesive, cohesive, releasability and antimicrobial attributes, while also permitting a restorative cleansability function via conventional washing and/or autoclaving techniques. Accordingly, the unexpected cohesiveness attributes of the thermoset viscoelastomeric polymer 110 substantially prevent plasticizer leakage from the inventive polymer 110, which solves a long-standing problem of existing polymers having high plasticizer loadings (i.e., greater than about 10 wt % of the total reaction media weight).

A highly effective thermosetting reaction media for preparing the inventive polymer 110 of the present disclosure comprises a prepolymer, polyols and plasticizer. More particularly, the reaction media comprises (i) a prepolymer, such as an isocyanate prepolymer (e.g., a polyol reacted with an isocyanate), preferably a diisocyanate prepolymer (e.g., methylene diphenyl diisocyanate (MDI)), ranging from about 2 wt % to about 10 wt % of the total reaction media weight; (ii) polyols, ranging from about 35 wt % to about 75 wt % of the total reaction media weight, wherein the polyols include straight chain linking polyols (preferably diols) and crosslinking polyols (preferably triols); and (iii) plasticizer, ranging from about 10 wt % to about 60 wt % of the total reaction media weight, wherein the plasticizer includes an epoxidized triglyceride plasticizer in an amount of about 10 wt % to less than about 50 wt % of the total reaction media weight, such as about 10 wt % to about 45 wt % of the total reaction media, or about 10 wt % to less than 45 wt % of the total reaction media weight to provide improved benefits, and optionally a reaction media viscosity-reducing plasticizer, preferably an ester plasticizer, in an amount of about 0 wt % to about 40 wt % of the total reaction media weight. The inventive thermoset viscoelastomeric polymer 110 can also optionally comprise additional components including, but not limited to, additional plasticizers, catalysts, initiators, colorants (e.g., dyes), UV inhibitors, antioxidants, and the like, as would be known to persons having ordinary skill in the art, without departing from the scope of the invention. As referenced above, it has been observed herein that the weight of the reaction media and the weight of the resulting reaction product (i.e., the polymer 110) remains substantially equivalent upon mixing and curing the reaction media; thus, the compositional amount (i.e., wt %) of each constituent may be expressed in terms of "wt % by weight of the polymer" without departing from the scope of the invention.

As referenced above, the thermosetting reaction media (and thus the resulting inventive polymer 110) comprises a quantity of prepolymer which forms the backbone of the polymer 110. Such prepolymer will typically be present in an amount of about 2 wt % to about 10 wt % of the total reaction media weight, such as about 3 wt % to about 9 wt %, or about 4 wt % to about 8 wt % of the total reaction media weight to provide improved benefits. Suitable prepolymers can include a ring-opening species of a hardener (e.g., amines, amides, mercaptans, anhydrides, isocyanates including polyisocyanates (such as a diisocyanate), etc.).

Suitable polyisocyanates include, but are not limited to, aromatic diisocyanates (e.g., diphenylmethane diisocyanate, methylene diphenyl diisocyanate (MDI), toluene diisocyanate (TDI), etc.) and aliphatic diisocyanates (e.g., hexamethylene diisocyanate (HDI), isophorone diisocyanate (IPDI), etc.) in a conventional prepolymer form. In one non-limiting example, a methylene diphenyl diisocyanate (MDI) designated as ELASTOCAST TQZ-P23, available from BASF Corporation, having a place of business located in Florham Park, New Jersey, USA, can provide a suitable prepolymer to form the inventive thermoset viscoelastomeric polymer 110 of the present disclosure, and ultimately the inventive adhesive products 100 thereof.

The thermosetting reaction media (and thus the resulting inventive polymer 110) also comprises a quantity of polyols, typically ranging from about 35 wt % to about 75 wt % of the total reaction media weight, such as about 38 wt % to about 65 wt %, or about 40 wt % to about 55 wt % of the total reaction media weight, to provide improved benefits. More particularly, the polyols include straight chain polyols and crosslinking polyols. In some desirable aspects, the straight chain polyols can be in the form of diols (e.g., a diol having two terminal reactive groups), and the crosslinking polyols can be in the form of triols (e.g., having two terminal reactive groups and one additional reactive group). The diol and triol components of the reaction media are typically liquid at room temperature (i.e., about 21° C.) and generally have a molecular weight of about 1,000 to about 20,000, such as about 1,000 to about 15,000, or about 1,000 to about 10,000, to provide improved benefits. The adhesiveness and cohesiveness of the resulting inventive polymer 110 depend upon using a controlled polyol balance within the thermosetting reaction media. It has been discovered herein that the amount of diols and triols (preferably reacted in the presence of an effective amount of plasticizer within the reaction media) can suitably fall within a prescribed diol to triol weight ratio of about 1:3 to about 3:1, such as about 1:2 to 2:1, or about 7:13 to about 13:7, to provide the desired viscoelastic, adhesive, cohesive, releasability, cleansability, and/or antipathogenic attributes for effective use herein (while also inhibiting bleeding of plasticizer from the polymer 110). The content and type of polyols can have a pronounced effect upon imparting the necessary thermoset polymeric infrastructure for obtaining the inventive polymer 110 attributes herein. Accordingly, it has been discovered herein that when the weight ratio of diols to triols deviates outside a range of about 1:3 to about 3:1, the desired adhesiveness, cohesiveness and releasability attributes of the resultant polymer 110 will begin to diminish. Thus, a controlled balance within the cited range with respect to the straight chain diols and the crosslinking triols can provide an effective reaction media for preparing a thermoset viscoelastomeric polymer 110 uniquely possessing the viscoelastic, adhesiveness, cohesiveness, releasability, cleansability, and antimicrobial features for the inventive products 100 of the present disclosure. It has also been discovered herein that the resulting polymer 110 further possesses a resistance to melting when subjected to heat.

In general, the diol component of the inventive thermoset viscoelastomeric polymer 110 can provide straight chain infrastructure formation and sufficient crosslinkage disruption to permit for a highly effective intermolecular plasticizer attraction and alignment, thus providing for an unusually high and effective loading of the viscoelastic, adhesive, cohesive and antipathogenic contributing plasticizer co-factors. In some preferred embodiments, the straight chain diol can be provided by a polyether diol having a molecular weight suitably ranging from about 1,000 to about 10,000, such as about 1,000 to about 8,000, or about 2,000 to about 6,000 for improved benefits, and preferably having two (2) terminal reactive groups (e.g., hydroxyl groups). Such polyether diol can be suitably present in an amount ranging from about 1 wt % to about 65 wt % of the total reaction media weight, such as about 5 wt % to about 55 wt %, or about 10 wt % to about 45 wt % of the total reaction media weight, to provide improved benefits. In one example, a 2-functional polyether diol, designated as ELASTOCAST C-4057, available from BASF Corporation, can provide a suitable diol component to form the inventive thermoset viscoelastomeric polymer 110 of the present disclosure.

In general, the crosslinking polyol component of the inventive thermoset viscoelastomeric polymer 110 can provide sufficient crosslinkage infrastructure to the polymer 110, and can contribute to the unexpected cohesiveness, releasability and stability attributes thereof. In some preferred embodiments, the crosslinking polyol can be provided by a polyether triol having a molecular weight suitably ranging from about 1,000 to about 10,000, such as about 2,000 to about 8,000, or about 3,000 to about 7,000 for improved benefits, and preferably having three (3) reactive groups (e.g., hydroxyl groups) wherein two (2) of the reactive groups are terminal reactive groups. Such polyether triol can be suitably present in an amount ranging from about 3 wt % to about 50 wt % of the total reaction media weight, such as about 10 wt % to about 45 wt %, or about 20 wt % to about 40 wt % of the total reaction media weight, to provide improved benefits. In one example, a 3-functional polyether triol, designated as ELASTOCAST C-4018, available from BASF Corporation, can provide a suitable triol component to form the inventive thermoset viscoelastomeric polymer 110 of the present disclosure.

The adhesiveness properties of the inventive polymer 110 can be tailored to fit the need for any given item 140 to be attached thereto. Accordingly, the thermosetting reaction media may be properly formulated so as to impart a desired degree of adhesiveness for the adherence and stabilization of any given item 140 adhered thereto while still retaining the desired cohesiveness of the polymer 110. For example, in general, increasing the diol to triol ratio (i.e., increasing the diol content relative to the triol content) will result in an increased adhesiveness of the polymer 110. Conversely, decreasing the diol to triol ratio (i.e., increasing the triol content relative to the diol content) will generally result in an increased cohesiveness of the polymer 110. Thus, controlling the diol to triol weight ratio within the range of about 3:1 to about 1:3 for example can result in a polymer 110 having a desired adhesiveness and cohesiveness for the adhesion and subsequent release of any particular item 140.

The inventive thermoset viscoelastomeric polymer 110 also comprises a quantity of plasticizer typically ranging from about 10 wt % to about 60 wt % of the total reaction media weight, such as about 15 wt % to about 55 wt %, or about 20 wt % to about 50 wt % of the total reaction media weight, to provide improved benefits. More particularly, the plasticizer includes a triglyceride plasticizer, and can optionally further include a process aid (i.e., reaction media viscosity reducing) plasticizer. In preferred embodiments, the triglyceride plasticizer is an epoxidized triglyceride plasticizer, and the optional viscosity reducing plasticizer is an ester plasticizer. The plasticizer components of the thermoset reaction media are typically liquid at room temperature (i.e., about 21° C.). It has been discovered herein that the weight ratio of triglyceride plasticizer to viscosity reducing plasticizer can suitably fall within a prescribed weight ratio range of about 1:0 to about 1:1, such as about 6:1 to about 1:3, or about 3:1 to about 1:2, to provide a workable reaction media viscosity for a particular application, and to help provide the desired viscoelastic, adhesiveness, cohesiveness, releasability, cleansability, and/or antipathogenic attributes of the resulting polymer 110. The content and type of plasticizers can have a pronounced effect upon imparting the desired polymer 110 attributes herein. Thus, a controlled amount of triglyceride plasticizer (e.g., epoxidized triglyceride plasticizer) and optional viscosity reducing plasticizer (e.g., ester plasticizer) within the prescribed range can provide an effective reaction media for preparing a polymer 110 uniquely possessing the desired compositional attributes for use herein. Desirably, the plasticizer component is uniformly dispersed and cohesively bound throughout the thermosetting reaction media (along with the other polymerizable thermosetting components) and will tenaciously remain uniformly dispersed within the resultant thermoset viscoelastomeric polymer 110 in a highly cohesive and stabilized (i.e., resistance to plasticizer bleeding) form.

Suitable triglyceride plasticizers for preparing the inventive thermoset viscoelastomeric polymer 110 desirably include epoxidized triglyceride plasticizers. Epoxidized triglyceride plasticizers, such as epoxidized animal oils and epoxidized vegetable oils, are particularly effective as a plasticizer component in the thermosetting viscoelastomeric reaction media herein. Amongst the suitable epoxidized triglyceride plasticizers, epoxidized vegetable oils (e.g., soybean, castor, corn, cottonseed, perilla, safflower, linseed, tall, etc.) have been found to be particularly effective triglyceride plasticizers herein. Other suitable triglyceride plasticizers have been more extensively described in the aforementioned cross-referenced related applications. Such triglyceride plasticizers can be suitably present in an amount that is less than about 50 wt % of the total reaction media weight, such as less than about 45 wt %, or about 10 wt % to less than 50 wt %, or about 10 wt % to less than about 45 wt % of the total reaction media weight, to provide improved benefits. In one desirable example, epoxidized soybean oil can provide a highly suitable triglyceride plasticizer to form the inventive thermoset viscoelastomeric polymer 110 of the present disclosure.

The inventive thermoset viscoelastomeric polymer 110 can also optionally comprise a suitable reaction media viscosity reducing plasticizer. In general, those plasticizers which are suitable as plasticizing agents for the plasticization of polyvinyl chlorides can be utilized as viscosity reducing plasticizers for the reaction media herein. Exemplary viscosity reducing plasticizers for preparing the inventive polymer 110 can include, but are not limited to, ester plasticizers. Such ester plasticizers are especially effective as an optional additional plasticizer component in the thermosetting reaction media. Suitable ester plasticizers typically have a relatively low molecular weight, typically less than about 750, or less than about 500, and can include, but are not limited to, the condensation products of alcohols (e.g., $C_1$-$C_{10}$ alcohols, such as $C_2$-$C_6$ alcohols) and dicarboxylic acids (e.g., $C_2$-$C_{12}$ dicarboxylic acids, such as $C_4$-$C_8$ dicarboxylic acids). In addition, amongst the more fluid ester plasticizers, such as diester plasticizers for example, are the lower dialkyl esters of dicarboxylic acids, such as dialkyl esters having alkyl groupings of less than 12 carbon atoms, such as $C_1$-$C_8$ dialkyl ester groupings of sebacates, adipates, phthalates, isophthalates, maleates, azelates, glutarates, etc., which have been found to be particularly effective ester plasticizers herein.

In some aspects, the polar strength (often referred to as "dipole moment") of such ester plasticizers depends, to a certain degree, upon the alcohol condensation reactant chain length, which can also have an effect upon the adhesiveness characteristics of the thermoset viscoelastomeric reaction product. For example, non-epoxidized plasticizers having a relatively high dipole moment (e.g., dibutyl sebacate, having a dipole moment of 2.48 debyes (D), as compared to epoxidized plasticizers having a dipole moment near 0 D) can be effective in retaining the desired properties of the polymerizate while also providing a thermosetting reaction media exhibiting a reduced working viscosity, which is particularly effective for use in permeating porous interstices or fabric structures of a support member 120. Suitable ester plasticizers can have a dipole moment of greater than about 1.5 D, such as greater than about 2.0 D, to provide improved benefits. The ester plasticizers can be suitably present in an amount ranging from about 0 wt % to about 40 wt % of the total reaction media weight, such as about 1 wt % to about 30 wt %, or about 2 wt % to about 20 wt % of the total reaction media weight for improved benefits. In one non-limiting example, dibutyl sebacate can provide a highly suitable ester plasticizer to form the reaction media of the present disclosure.

In some aspects, the incorporation (within the ranges prescribed herein) of the relatively low molecular weight ester plasticizer in combination with the triglyceride plasticizer (e.g., epoxidized triglyceride plasticizer) can be utilized herein to provide an easier fabricating form (e.g., for casting, molding, injecting, pouring, spraying, printing, etc.) of the uncured polymer mix by lowering the viscosity of the reaction media without adversely affecting the desirable features of the inventive thermoset viscoelastomeric polymer 110. For example, the addition of polar ester plasticizers, or substitution of the triglyceride plasticizers with polar ester plasticizers, has been found to effectively reduce the viscosity of the reaction media while still maintaining a desired level of adhesiveness and cohesiveness of the resulting polymer 110, as well as excellent releasability and stability properties. It has been discovered herein that including an ester plasticizer having a fluid consistency at room temperature (i.e., about 21° C.) and having a relatively low molecular weight (e.g., less than about 750) in the reaction media can contribute to ideal working viscosities during the initial curing stages, rendering the reaction media to be more effective for forming certain inventive products 100 of the present disclosure. Inclusion of an ester plasticizer can be particularly desirable where uncured reaction media is first applied to a support member 120 or a conventional non-adhesive article 150 in a substantially liquid form, and then cured in situ, to form a tenacious bonding between the resulting polymer 110 and the support member 120 or article 150.

As referenced above, the plasticizer component is desirably uniformly incorporated into the thermosetting reaction media (along with the other polymerizable thermosetting reactants) and will tenaciously remain uniformly dispersed within the resultant inventive thermoset viscoelastomeric polymer 110 herein in a highly cohesive and stabilized form. The straight chain producing diols and crosslinking triols, in cooperative combination with the plasticizer, create a thermoset viscoelastomeric polymeric structure possessing a high degree of compositional adhesiveness and cohesiveness which is desirable to adhesively secure and retain an item 140, while also allowing for a clean cohesive separation of the item 140 from the inventive polymer 110 (upon application of a sufficient force to the item 140 which overcomes the adhesive force of the polymer 110), desirably leaving no visually detectable polymeric residue on the item 140. Controlling the reaction media weight ratio of triglyceride plasticizer and optional ester plasticizer (along with the diol to triol weight ratios) accordingly constitutes an important consideration in preparing the reaction media for the inventive thermoset viscoelastomeric polymer 110. For example, if the amount of plasticizer is excessively high (i.e., outside the range prescribed herein), the resultant polymer 110 will tend to lose its desired cohesiveness and will then tend to distort (i.e., may not return to its original innate form as when initially formed), and/or will tend to bleed plasticizer. However, it has been discovered herein that in certain instances, increasing the triol content can partially arrest such plasticizer bleeding, but such triol increase will then tend to decrease the adhesiveness of the polymer 110.

The unique bridged crosslinked polymeric structure of the thermoset polymerizate 110 obtained from an appropriate thermoset reaction media provides an ideal infrastructure for effectively harboring the plasticizer in an unexpectedly superior cohesive and adhesive form. Indeed, it appears that the crosslinked infrastructure and the polarity provided by the polymerized diols and triols orients the polarized plasticizer within the resulting polymer 110 so as to impart, inter alia, the unexpected viscoelastic, adhesiveness, cohesiveness, stability, cleansability and antimicrobial properties to the inventive polymer 110 herein.

The inventive thermoset viscoelastomeric polymer 110 can also optionally comprise additional constituents including, but not limited to, catalysts, initiators, other additional plasticizers, colorants, UV inhibitors, antioxidants, and the like, as would be known to persons having ordinary skill in the art, without departing from the scope of the invention. For example, the polymerization of the thermosetting reaction media can be carried out in the presence of a catalyzing amount (defined above) of a catalyst (e.g., a slow-acting catalyst or a heat-activated catalyst) to control the curing rate of the reaction media. Suitable catalysts can include tertiary amines, tertiary phosphines, strong bases (e.g., alkali, alkaline earth metal hydroxides, alkoxides, phenoxides, etc.), acidic metal salts of strong acids, metal chelates, metal alcoholates, metal phenolates, organic acid salts, organo metallic derivatives, etc. In one non-limiting example, a slow-acting organobismuth catalyst, available under the trade name COSCAT 83 (available from Vertellus Holdings LLC, having a place of business located in Zeeland, Michigan, USA), can provide a suitable catalyst for controlling the curing rate of the thermosetting reaction media to form the inventive thermoset viscoelastomeric polymer 110. In another non-limiting example, a heat-activated tin thioglycolate catalyst, available under the trade name FOMREZ CATALYST UL-29 (available from Momentive Performance Materials Inc., having a place of business located in Wilton, Connecticut, USA), can provide a suitable catalyst for controlling the curing rate of the thermosetting reaction media to form the inventive thermoset viscoelastomeric polymer 110.

Procedurally, the reaction product which forms the inventive thermoset viscoelastomeric polymer 110 can be prepared from a thermosetting reaction media homogeneously loaded with plasticizer(s) which includes a triglyceride plasticizer (preferably an epoxidized triglyceride plasticizer, such as epoxidized vegetable oil) as well as optionally any other effective polar plasticizer, coupled with a carefully measured amount of straight chain diols and crosslinking polyols (to create the necessary bridging between the crosslinks), and an isocyanate prepolymer hardener (e.g., diisocyanate, such as aliphatic, aromatic, heterocyclic, etc., polyisocyanates, cycloaliphatic isocyanates and arylaliphatic isocyanates), and typically in the presence of an appropriate catalyst (e.g., preferably a relatively slow acting catalyst). The reaction media desirably contains the necessary plasticizer loading specifically adapted to provide a curable reaction media, which upon curing, produces a viscoelastomeric reaction product (i.e., polymer 110) having a unique polymerizate structure effectively loaded with polar oriented plasticizers uniformly and homogeneously distributed throughout the polymer's entire thermoset mass, intertwined therewithin, and supported by the flexible plasticizer-entrapping, thermoset polymerizate structure. Under the most effective thermosetting and fabricating conditions, the thermosetting polymerizate reactants and the plasticizers are collectively provided in the reaction media as liquids at room temperature (i.e., about 21° C.) without necessitating the use of any solvents, other chemical dispersion aids or elevated temperatures, in order to homogeneously disperse the reaction media components. Accordingly, this allows the thermosetting reaction to be effectively conducted at room temperature.

The crosslinked polymeric structure of the inventive thermoset viscoelastomeric polymer 110 obtained from an appropriate thermosetting reaction media provides an ideal infrastructure for effectively harboring plasticizer components in an unexpectedly desirable viscoelastic, adhesive, cohesive and stabilized (i.e., substantially no plasticizer bleeding) polymeric form, while also providing unexpected antimicrobial properties and cleansability/reusability properties, as well as a resistance to melting when subjected to heat. Desirably, the plasticizer is uniformly incorporated throughout the reaction media containing the polymerizable components, and remains uniformly dispersed within the resultant polymer 110 in a highly cohesive form, thus preventing leakage of the plasticizers therefrom. It appears that the crosslinked infrastructure and the polarity provided by the polymerized straight chain diols and crosslinking polyols (e.g., polyether diols and polyether triols) orients the polarized plasticizer components (e.g., epoxidized triglyceride plasticizer and optional ester plasticizer) within the resulting polymer 110 to impart the unexpected viscoelastic, adhesiveness, cohesiveness, releasability, stability, cleansability, reusability and antimicrobial properties to the inventive polymer 110 herein. Thus, the thermosetting diols and triols in cooperative combination with the plasticizer create a thermoset polymeric structure possessing a high degree of compositional adhesiveness and cohesiveness for effective usage with the inventive products 100 of the present disclosure, while also allowing for a clean cohesive separation from an item 140 (i.e., leaving substantially no visible polymeric residue on the item 140) which is adhered to the resulting inventive polymer 110.

From a molecular infrastructure standpoint, the unique combination of straight chain and crosslinking reactants and plasticizer types in the amounts prescribed herein creates a uniquely different and inventive polymer 110. The appropriate control of straight chain diol and crosslinking polyol reactants appears to create long chain polarized sites ideal for powerful cohesive polar entrapment of the plasticizer while also aligning the polarized plasticizer components in a powerful adhesive and cohesive positioning within the inventive polymer 110. The polarized molecular alignment of the plasticizer cofactor within the polymeric infrastructure contributes to a highly cohesive structure which maintains its molecular integrity when subjected to forces which effect separation of the inventive polymer 110 from a contacting surface of an item 140. The plasticizer appears to also be a major contributing factor in the inventive polymer's unique viscoelastomeric properties. As a result, the inventive thermoset viscoelastomeric polymer 110 possesses a host of unexpectedly unique and superior properties (e.g., adhesiveness, cohesiveness, releasability, stability, cleansability, reusability, antimicrobial, etc.) over conventional adhesive polymers currently available.

As referenced above, the thermosetting straight chain linking diols and crosslinking polyols (e.g., triols) in cooperative combination with the plasticizer create an inventive polymer 110 having antimicrobial properties, as well as a thermoset viscoelastic polymeric structure possessing a high degree of compositional adhesiveness and cohesiveness necessary to adhesively secure and retain items 140, in addition to a clean cohesive separation from the items' 140 surfaces. The type of plasticizers and reactants in controlled amounts (within the quantity ranges prescribed herein) can also be effectively utilized to provide desirable thermosetting fabrication conditions for preparing the inventive polymer 110, and thereby providing inventive products 100 possessing the unique attributes herein.

As a result of its unique chemical composition and processing conditions, the thermoset viscoelastomeric polymer 110 component of the inventive products 100 herein possesses a host of unique and unexpected properties. For example, the inventive polymer 110 exhibits advantageously unique viscoelastic properties. Due to its fluidic properties (as opposed to compression properties, such as found in foam or rubber compositions), such viscoelastic properties allow the inventive polymer 110 to at least partially surround and conform to the configuration of an item 140 due to the weight of such item 140 and/or force exerted when a user places the item 140 upon the polymer 110 component of the products 100 herein. The result is an increased contacting surface area of the item 140 for better adhesion and adhesive performance. This provides a significant advantage over conventional adhesive products (which typically exhibit compression properties as opposed to viscoelastic properties).

In addition, the polymer 110 component of the inventive adhesive products 100 herein also exhibits advantageously unique adhesiveness properties. The overall tackiness, or adhesiveness, of the inventive polymer 110 and its concomitant releasability characteristics can be effectively altered so as to match the needs of a particular item 140 by changing the compositional makeup of the thermosetting reaction media, particularly the straight chain diol to crosslinking polyol reaction media weight ratio, as well as the reaction media plasticizer content and the types of plasticizers. For example, an increase in the amount of straight chain diol (with respect to the amount of crosslinking polyol) will tend to increase the adhesiveness of the polymer 110, and thus also increase the amount of force required to release an item 140 from the polymer 110. Conversely, an increase in the amount of crosslinking polyol (with respect to the amount of straight chain diol) will tend to decrease the adhesiveness of the polymer 110, and thus also decrease the amount of force required to release an item 140 from the polymer 110. In the case where the amount of straight chain diol (with respect to the amount of crosslinking polyol) is increased, it has been found herein that a slight increase in the amount of prepolymer will generally serve to balance the reaction media reactants. In general, products 100 comprising the polymer 110 having a relatively high degree of adhesiveness will tend to be less effective for releasing relatively small, light and/or fragile items 140, but will tend to be more effective for adhering and stabilizing relatively larger, heavier and/or odd-shaped items 140. Typically, the adhesiveness of the polymer 110 component of this disclosure (and thus of the inventive adhesive products 100 herein) will range from about 100 $g_f/cm^2$ to about 2,500 $g_f/cm^2$ as measured by the Adhesiveness and Cohesiveness Test, such as about 200 $g_f/cm^2$ to about 2,000 $g_f/cm^2$ or about 300 $g_f/cm^2$ to about 1,500 $g_f/cm^2$ to provide improved benefits.

Another unique advantage of the inventive adhesive products 100 herein resides in the manner in which the viscoelastomeric thermoset polymer 110 component will adhesively interact with items 140 which are adhesively attached thereto. The polymer 110 component's adhesive interaction with items 140, when such items 140 are placed thereupon, typically exhibits a slight initial increase in adhesiveness within about 5 to about 10 seconds after the initial adhesive attachment of an item 140 to the polymer 110 component, which is then followed by a stabilization to about 90% of its maximum or ultimate adhesive attraction within about 60 seconds after the initial adhesive attachment of an item 140 to the polymer 110 component. This slight change in adhesiveness may be indicative of an intermolecular realignment, coordinate covalent bonding, polarization of the plasticizing components, or some other molecular interaction therewithin. This subsequent adhesive increase may also be due to the viscoelastomeric properties of the polymer 110 component, which due to adhesive cradling of an adhered item 140, will provide added interfacing surface contacting area with the adhered item 140, resulting in an increase and subsequent stabilization of the adhesive attraction therebetween.

Another unique advantage of the inventive adhesive products 100 herein resides in the retention of at least their adhesiveness and cohesiveness properties. Surprisingly, the thermoset viscoelastomeric polymer 110 component of the products 100 as provided by this invention retains a substantially unchanged degree of adhesiveness and cohesiveness with respect to adhered items 140 over prolonged periods of time (e.g., at least six (6) weeks or more), such as measured by the Adhesiveness and Cohesiveness Test. This provides another significant advantage over conventional adhesive products (wherein the adhesiveness and/or cohesiveness tends to degrade over time).

In addition, the polymer 110 component of the inventive adhesive products 100 herein also exhibits advantageously unique cohesiveness properties. For example, upon exposure to a counteracting force sufficient to overcome the adhesive attraction between an item 140 and the inventive adhesive products 100 herein (e.g., pulling an adhesively engaged item 140 away from the polymer 110 component to disengage the item 140), the compositional cohesiveness of the polymer 110 component will tenaciously retain its viscoelastomeric structural integrity by cohesively releasing substantially cleanly (i.e., without leaving substantially any visible polymeric residue) from the item 140 and then returning to its original innate form as prior to engagement of the item 140. This provides a significant advantage with respect to reusability and effectiveness of adhesive products 100 comprising or consisting essentially of the inventive polymer 110, as compared to conventional adhesive products (which typically do not return to their same innate form and/or leave visible residue upon a detached item and/or are not reusable (i.e., without experiencing a reduction in effectiveness)).

In addition, the polymer 110 component of the inventive adhesive products 100 herein also exhibits advantageously unique releasability properties. More particularly, the inventive polymer 110 component possesses a tenacious internal compositional cohesiveness which provides an ability to release substantially cleanly away from an item 140 upon which it comes into contact, substantially without leaving any residue of the polymer 110 remaining on the surface of the item 140. Indeed, upon exposure to a suitable adhesive separating release force (e.g., pulling an adhesively engaged item 140 away from the polymer 110), the compositional cohesiveness of the polymer 110 component will tenaciously retain its viscoelastic structural integrity by separating substantially cleanly from the surface of an item 140 upon which it has come into contact (i.e., without leaving more than a trace of polymeric residue upon the surface). Accordingly, upon adhesive separation from such surface of an item 140, the polymer 110 component will return to its substantially intact and innate form as prior to adherence of the item 140, while leaving no more than a minuscule amount of polymeric residue adhering upon the item 140. More typically, upon separation from the surface of an item 140, there will exist no visible evidence (i.e., by a human eye having 20/20 vision) of polymeric residue remaining upon the item 140. This provides yet another significant advantage over conventional adhesive products (which typically leave a visually detectable amount of residue upon the surface of an item upon which it comes into contact).

During the removal of an item 140 from the inventive polymer 110 component of the inventive adhesive products 100 of the present disclosure, it has been observed herein that the polymer 110 tends to pull away from the surface of the item 140 until the polymer 110 completely separates (i.e., substantially breaks cleanly away) from the surface, and then the polymer 110 component forthrightly cohesively returns to its innate form as prior to the item's 140 adherence thereto. The extent of temporary distortion exhibited by the polymer 110 component upon exposure to separation forces from the surface of an item 140 will depend largely upon the adhesiveness, cohesiveness and viscoelastic properties of the polymer 110. It has been further observed herein that, upon coming into contact with a surface of an item 140, a polymer 110 herein having relatively higher adhesiveness values will physically tend to tenaciously string-out (similar to the pulling of heated candy taffy) until a clean adhesive, but cohesive, separation ultimately occurs from the surface of the item 140, whereupon the inventive polymer 110 component then returns to its original innate form, leaving substantially no residue upon the item 140.

In addition, the polymer 110 component of the inventive adhesive products 100 herein also exhibits antimicrobial properties. For example, the inventive polymer 110 can neutralize microbial pathogens (e.g., viruses, bacteria, germs, etc.) which may be present upon the engaged surfaces of an item 140. This provides still another significant advantage over conventional adhesive products (which typically do not exhibit such antimicrobial properties).

Figure 13A:
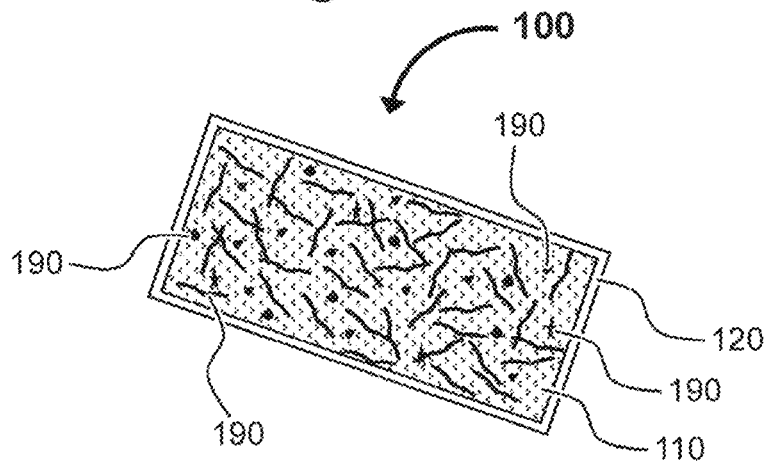
FIG. 13A is a top view showing a non-limiting exemplary embodiment of an inventive adhesive product, wherein the inventive adhesive product has a plurality of contaminants adhered to the polymer component thereof.
Figure 13B:
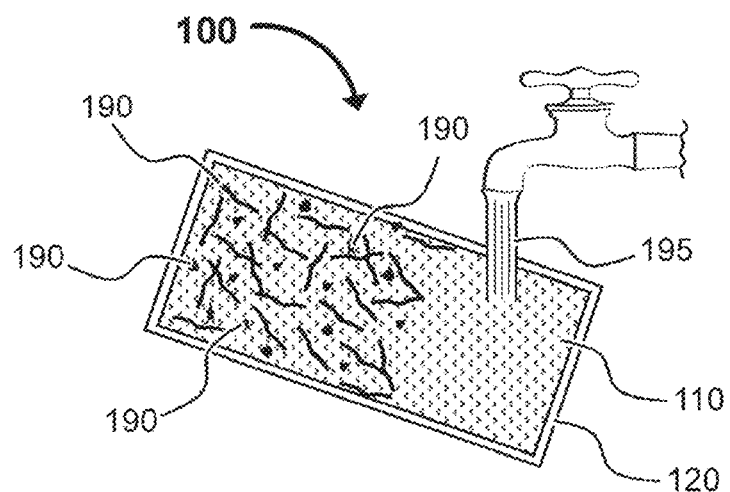
FIG. 13B is a top perspective view showing the inventive product of FIG. 13A while in the process of being cleansed with water to remove the contaminants attached thereto.
Figure 13C:
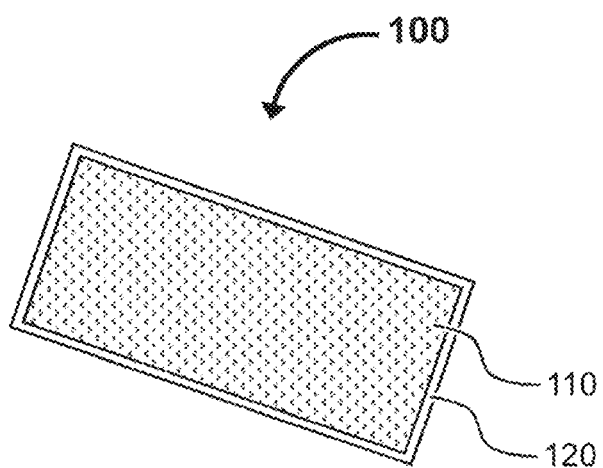
FIG. 13C is a top view of the inventive adhesive product of FIG. 13B after being cleansed and restored to its original state, such that it is ready for re-use.

In addition, with reference to FIGS. 13A-13C, the polymer 110 component of the inventive adhesive products 100 herein also exhibits unique cleansability properties. For example, due to its adhesive nature, the inventive polymer 110 component has a tendency to adhesively attract contaminants 190 (e.g., dust, lint, debris, and other external contaminants, including contaminants from an item 140 and/or a user) which can potentially diminish adhesiveness over time. However, the original adhesiveness of the inventive polymer 110 component can be easily restored via conventional washing and/or other suitable contaminant removal techniques. For example, unlike conventional adhesive products which must be discarded upon contamination (often after merely a single use), the inventive polymer 110 component of the present invention may be cleansed from contaminants and restored to its substantially original adhesive, cohesive and antimicrobial efficacy. Surprisingly, conventional washing with water 195 or with a solution of water and common soap (e.g., rinsing, hand-washing, scrubbing, washing machines, dishwashers, etc.), as well as autoclaving (i.e., applying high pressure steam), may be effectively utilized to eradicate and remove contaminants 190 therefrom and thereby permit fully functional re-use of the cleansed inventive polymer 110 component and the adhesive product 100 thereof. Accordingly, the inventive polymer 110 of this disclosure and the adhesive products 100 thereof are environmentally friendly, and may be considered as "green" technology as well. This provides yet another significant advantage over conventional adhesive products (which typically do not exhibit such cleansability and reusability capabilities).

In some embodiments, the inventive thermoset viscoelastomeric polymer 110 can be prefabricated into a desired form (e.g., shape profile, dimensions, etc.) using various techniques as known to persons having ordinary skill in the art. Such prefabrication techniques can include, but are not limited to, casting, molding, pouring, injecting, film forming, brushing, spraying, and the like. Prefabrication of the inventive polymer 110 typically comprises first preparing the thermosetting reaction media, then utilizing a desirable prefabrication process while the reaction media is in a liquid or semi-liquid (i.e., partially cured) form, and subsequently allowing the reaction media to fully cure into the inventive polymer 110. This can be accomplished, inter alia, by disposing liquid reaction media (i.e., uncured or partially cured) into a suitable mold and then curing the reaction media to form the polymer 110 component, or by pouring and curing a layer of the reaction media, allowing it to cure, and then cutting polymer 110 components therefrom. Other methods for forming the polymer 110 component which will be apparent to persons having ordinary skill in the art are also suitable, without departing from the scope of the invention. Such prefabricated form of the inventive polymer 110 can have any shape profile and dimensions as may be desired without departing from the scope of the invention, including those known to persons having ordinary skill in the art, such as a pad, a substrate, an insert, a disk, a frame, a strip, a sheet, a film, an overlay, a mat, a bead, a cord, a sphere, a random shape, a lump, and the like.

It has been discovered herein that certain polymeric materials, such as halogenated polymers (e.g., polyvinylchloride (PVC)) (except for special formulations) are generally adhesively incompatible with the adhesiveness properties of the inventive thermoset viscoelastomeric polymer 110 (i.e., the polymer 110 does not adhere well to such materials). As a result, such incompatible materials can provide excellent release properties from the polymer 110, which renders such incompatible materials particularly effective for use as a mold material which can be utilized to cure the reaction media and thus prefabricate the polymer 110 component. However, it should be understood that if such incompatible materials have a porous, fabric or patterned structure, such structures can provide anchoring or penetration sites for the polymer 110 component (e.g., due to the polymer's 110 viscoelastic nature), thus rendering such materials to be unsuitable for use as a mold material (and therefore more suitable for use as a support member 120 herein).

In other embodiments, the inventive thermoset viscoelastomeric polymer 110 can be formed in combination with an additional material (e.g., a solid material having a surface). In such embodiments, the reaction media while in a liquid or partially-cured form is applied to a surface of the material (e.g., a support member 120, conventional non-adhesive article 150, etc.) and optionally allowed to soak at least partially into the material (such as where the material is porous). The reaction media is then allowed to fully cure in situ to form the inventive thermoset viscoelastomeric polymer 110 further comprising the material. It has been discovered herein that in such "in situ" embodiments, the polymer 110 tends to form a stronger bond with the material upon which it is applied, as compared the adhesive bonding of the prefabricated form. It is believed that in such in situ embodiments, attachment of the polymer 110 to the material includes additional bonding (e.g., chemical bonding) to the material, in addition to the adhesive bonding common to both the in situ embodiments and the prefabricated embodiments.

Accordingly, the inventive thermoset viscoelastomeric polymer 110 can be utilized to provide useful products 100, preferably adhesive products. As referenced above, in some embodiments, such inventive products 100 can consist essentially of the thermoset viscoelastomeric polymer 110 of the present disclosure to form a standalone adhesive product 100. In other embodiments, the inventive products 100 can comprise the polymer 110 and a support member 120. In yet other embodiments, the inventive products 100 can comprise the polymer 110 and a conventional non-adhesive article 150 (e.g., a consumer good).

Referring now to FIGS. 1A-6, in some embodiments, the inventive products 100 of the present disclosure can consists essentially of the inventive thermoset viscoelastomeric polymer 110 to form a prefabricated standalone adhesive product 100. For example, as illustrated in FIG. 1A, a non-limiting exemplary product 100 of this embodiment can be in the form of a generally rectangular adhesive pad having at least a first or top side 102 (which can be a generally planar surface) and an opposing second or bottom side 104 (which can be a generally planar surface) distal to the top side. However, it should be understood that the products 100 of this embodiment can comprise any functional shape profile or form, such as a circular disk, a frame, a strip, substrate, a pad, an insert, an overlay, a film, a mat, a bead, a cord, a sphere, a random shape, a lump, and the like, without departing from the scope of the invention (see e.g., FIGS. 3-6).

Preferably, the adhesive products 100 of this embodiment will be appropriately sized to accommodate a particular item 140 or array of items intended to be adhered thereto. For example, in one non-limiting exemplary embodiment, a product 100 having a generally rectangular shape can have length and width dimensions of less than about 100 cm and 50 cm, respectively, such as less than about 50 cm and 20 cm, respectively, or less than about 10 cm and 7 cm, respectively. However, such non-limiting exemplary embodiment can have length and width dimensions which are greater than 100 cm and 50 cm, respectively, without departing from the scope of the invention.

In preferred embodiments, the inventive products 100 of this embodiment are releasably adhesive, such that an item 140 which becomes attached to the inventive product 100 can also be removed from the product 100 (such as via application of a sufficient removal force to overcome the adhesive force of the inventive product 100 to such item 140) and/or the inventive products 100 of this embodiment can be removed from a surface upon which it has been adhered (such as upon application of a sufficient removal force to overcome the adhesive force of the inventive product 100 to such surface), such as for purposes of cleaning the standalone adhesive product 100 of this embodiment or relocating the product 100 to another surface, for example. In other words, in preferred embodiments, the inventive standalone adhesive products 100 of this embodiment are not intended to permanently bond an item 140 thereto or to permanently bond to a surface (although in some alternative embodiments, the product 100 can permanently bond to a surface, or can permanently bond an item 140 thereto, without departing from the scope of the invention).

In preferred embodiments, the standalone adhesive products 100 of this embodiment comprise at least viscoelastic, adhesiveness, cohesiveness, releasability and stability (i.e., resistance to plasticizer bleeding) properties. In further embodiments, such products 100 can comprise cleansability and/or antimicrobial properties, as well. Furthermore, it has been observed herein that the inventive polymeric product 100 of this embodiment is generally resistant to melting when subjected to heat.

Figure 2A:
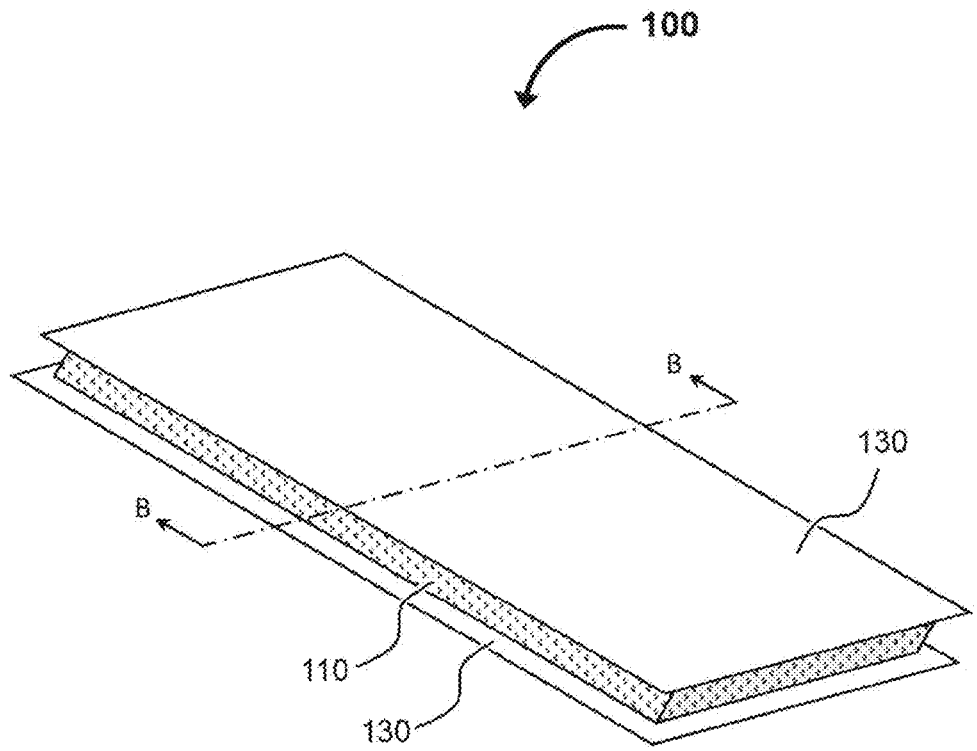
FIG. 2A is a perspective view showing a non-limiting exemplary embodiment of an inventive adhesive product of the present disclosure in the form of a standalone adhesive pad, and further comprising a protective covering member.
Figure 2B:
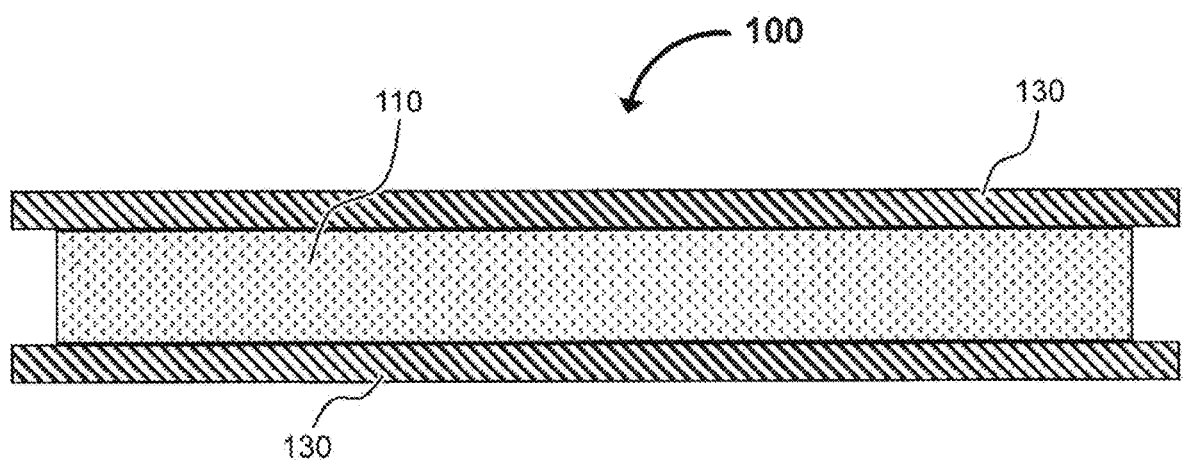
FIG. 2B is a side view of the inventive adhesive product of FIG. 2A taken along line B-B.

Because the polymeric product 100 of this embodiment exhibits adhesiveness on substantially all of its exposed surfaces, it may be desirable to provide the product 100 with a removable protective covering member 130 (see e.g., FIGS. 2A-2B). For example, such protective covering member 130 can allow for effective shipment of the product 100, ease of handling the product 100 (e.g., preventing the product 100 from adhering to a user's hands), and can prevent undesired contamination of the product 100 by dust and debris prior to its intended use. In some aspects, such protective covering member 130 can also be useful as packaging materials for the invention. Such protective covering member 130 can comprise any suitable material which can be completely (and preferably relatively easily) removed from the product 100 without leaving any materials upon the product 100 during removal. For example, materials which have a relatively low or incompatible adhesive affinity to the polymer 110 component can be used with the invention to provide a suitable protective covering member 130 for exposed surfaces of the polymer 110 component. Examples of suitable protective covering members 130 can include, but are not limited to, polyvinyl chloride (PVC) films, paraffin-coated substrates, TEFLON-coated substrates, and the like, which tend to be less compatible with the inventive polymer 110 (i.e., have less adhesive affinity to the polymer) than most other materials.

Referring now to FIGS. 7A-10B, in some embodiments, the inventive adhesive products 100 of the present disclosure can comprise the thermoset viscoelastomeric polymer 110 and a support member 120. In such embodiments, the polymer 110 component will typically be disposed onto and/or at least partially into the support member 120.

In some aspects of this embodiment, the polymer 110 component can be disposed onto an exposed surface of the support member 120. For example, the reaction media can first be prefabricated (i.e., pre-formed into a fully cured polymer 110 component), and then adhesively applied to a surface of the support member 120 to form the inventive product 100 (i.e., relying substantially on adhesive bonding for attachment of the polymer 110 component to the support member 120). Such prefabricated polymer 110 component of this example can comprise any functional shape profile or form, such as rectangular, circular, a frame, a strip, a substrate, a pad, an insert, an overlay, a film, a mat, a bead, a cord, a sphere, a random shape, a lump, and the like, without departing from the scope of the invention. In another example, uncured or partially-cured reaction media can be applied to a surface of a non-porous support member 120 and then allowed to fully cure in situ (relying on adhesive bonding and chemical bonding for attachment of the polymer 110 component to the support member 120). The reaction media of this aspect can be applied to the support member 120 using techniques as would be known to persons having ordinary skill in the art, including pouring, printing, calendaring, casting, brushing, spraying, dipping, and the like. The polymer 110 component of this example can comprise any functional shape profile or form, such as a coating, a film, a strip, substrate, a pattern, a random shape, and the like, without departing from the scope of the invention. In such aspects, the polymer 110 component can typically be removed from the support member 120.

In other aspects of this embodiment, the polymer 110 component can be disposed at least partially into the support member 120. For example, uncured or partially-cured reaction media can be applied to a surface of a porous support member 120 and allowed to at least partially soak into the interior structure of the support member 120. The reaction media can then be allowed to fully cure in situ (relying on adhesive bonding, chemical bonding and interactions within the interior structure of the support member 120 (e.g., friction, etc.) for attachment of the polymer 110 component to the support member 120). The reaction media of this example can be applied to the porous support member 120 using techniques as would be known to persons having ordinary skill in the art, including pouring, printing, calendaring, casting, brushing, spraying, dipping, and the like. The polymer 110 component of this example can comprise any functional shape profile or form, such as a coating, a strip, a pattern, a random shape, an integrated film, and the like, without departing from the scope of the invention. In such aspects, the polymer 110 component typically cannot be removed from the support member 120.

For products 100 of this embodiment, the support member 120 can provide structural support for the thermoset viscoelastomeric polymer 110. For example, in the exemplary rectangular embodiments of FIGS. 7A-10B, the support member 120 can comprise at least a first or top side 122 (which may be a major planar surface) and an opposing second or bottom side 124 (which may be a major planar surface) distal to the top side 122, wherein the thermoset viscoelastomeric polymer 110 is disposed upon the top side 122 of the support member 120. However, it should be understood that the support member 120 can have any desired shape profile (e.g., rectangular, square, trapezoidal, triangular, circular, oval, pattern, random, etc.) and can be appropriately sized to accommodate a particular item 140 or array of items intended to be adhered to the product 100. For example, in one non-limiting exemplary embodiment, the support member 120 can have a generally rectangular shape having length and width dimensions of less than about 100 cm and 50 cm, respectively, such as less than about 50 cm and 25 cm, respectively, or less than about 10 cm and 7 cm, respectively. However, such non-limiting embodiment can have length and width dimensions which are greater than 100 cm and 50 cm, respectively, without departing from the scope of the invention. Similarly, the support member 120 can have a thickness which may be uniform or non-uniform. There is no particular limit to the thickness, provided that the support member 120 performs as intended by the user. For example, in one non-limiting exemplary embodiment, the support member 120 can have a thickness of less than about 100 mm, such as about 1 mm to about 50 mm, or about 5 mm to about 10 mm. However, the support member 120 can have a thickness that is less than about 1 mm or greater than about 100 mm without departing from the scope of the invention.

The support member 120 can be rigid or flexible without departing from the scope of the invention. In addition, the support member 120 can optionally comprise additional features (e.g., sidewalls, perforations, etc.) without departing from the scope of the invention.

The support member 120 can comprise any suitable natural or synthetic material useful in providing a support structure for the products 100 this embodiment. For example, the support member 120 can comprise metal, wood, glass, ceramic, concrete, foams, plastics (e.g., polyethylene, polypropylene, etc.), polyesters, nylon, rayon, dacron, manila, polyethylene terephthalate, polyamides, polyurethane, linen, wool, cashmere, jute, polyacetates, polyacrylics, spandex, latex, orlon, cotton, silk, velvet, canvas, leather, fiberglass, acrylonitrile-butadiene-styrene polymers, polystyrene, and a host of other such natural and/or synthetic materials which can suitably support the thermoset viscoelastomeric polymer 110, as well as combinations thereof.

Desirably, the surface of the support member 120 upon which the thermoset viscoelastomeric polymer 110 is disposed will have an overall attachment affinity to the polymer 110 which is greater than the adhesive affinity of the polymer 110 to an item 140 intended to be attached to the product 100, in order to prevent detachment of the polymer 110 from the support member 120 upon removal of the item 140 from the product 100. This is typically accomplished by virtue of the overall contact area between the support member 120 and the polymer 110 component being greater than the overall area between the item 140 and the polymer 110. Alternatively, the support member 120 can have a relatively lower adhesive affinity towards the polymer 110 (as compared to any items 140 to be attached), provided however that the surface of the support member 120 comprises suitable anchoring sites or is porous such that the resultant overall attachment force between the support member 120 and the polymer 110 component is greater than the adhesive force between the item 140 and the polymer 110. Persons having ordinary skill in the art will recognize that the precise attachment force between the support member 120 and the polymer 110 component will vary depending upon numerous factors, such as the properties of the support member 120, the polymer 110 and the item 140 to be attached, for example. Accordingly, a support member 120 material wherein the overall attachment force of the polymer 110 thereto is less than the overall adhesive force of an intended item 140 to the polymer 110 component would generally not be a suitable material for providing the support member 120 component of the inventive products 100 of this embodiment.

In general, the thermoset viscoelastomeric polymer 110 component may be appropriately sized to accommodate a particular support member 120 and/or an item 140 or array of items 140. For example, the polymer 110 component can have any desired shape profile (e.g., rectangular, square, trapezoidal, triangular, circular, oval, random, etc.), and may desirably have a similar shape to the support member 120, though it need not be. Likewise, the dimensions of the polymer 110 component will typically be equal to or less than the dimensions of the support member 120. However, the dimensions of the polymer 110 component can also be greater than the dimensions of the support member 120 (in one or more dimensions) without departing from the scope of the invention. In addition, the support member 120 can comprise a single polymer 110 component or multiple polymer 110 components without departing from the scope of the invention.

In this embodiment comprising a support member 120, the thermoset viscoelastomeric polymer 110 component can have a thickness which may be uniform or non-uniform. There is no particular limit to the thickness, provided that the adhesive product 100 performs as intended by the user. For example, in one non-limiting exemplary aspect, an adhesively applied polymer 110 component (e.g., wherein a prefabricated polymer 110 component is adhesively applied to the support member 120) can have a thickness of less than about 10 mm, such as less than about 5 mm, or less than about 3 mm, or about 1 mm to about 9 mm in thickness, to provide the desired cohesiveness and adhesiveness for removably adhering an item 140 to the product 100. In another non-limiting exemplary aspect, the polymer 110 component can be disposed in a thermoset bonded form (e.g., wherein the thermosetting reaction media is first applied to the support member 120 in liquid form and then cured in situ), a lesser thickness of the polymer 110 component may be effectively utilized, such as a thickness of less than about 8 mm, or less than about 4 mm, or less than about 1 mm, or about 0.3 mm to about 7 mm in thickness, to provide the desired cohesiveness and adhesiveness for removably adhering an item 140 to the product 100. It should be understood that thicker polymer 110 components (i.e., thickness greater than 10 mm and 8 mm, respectively) can also be utilized without departing from the scope of the invention, such as for adhering relatively heavier items 140 for example, but are generally unnecessary.

Figure 8A:
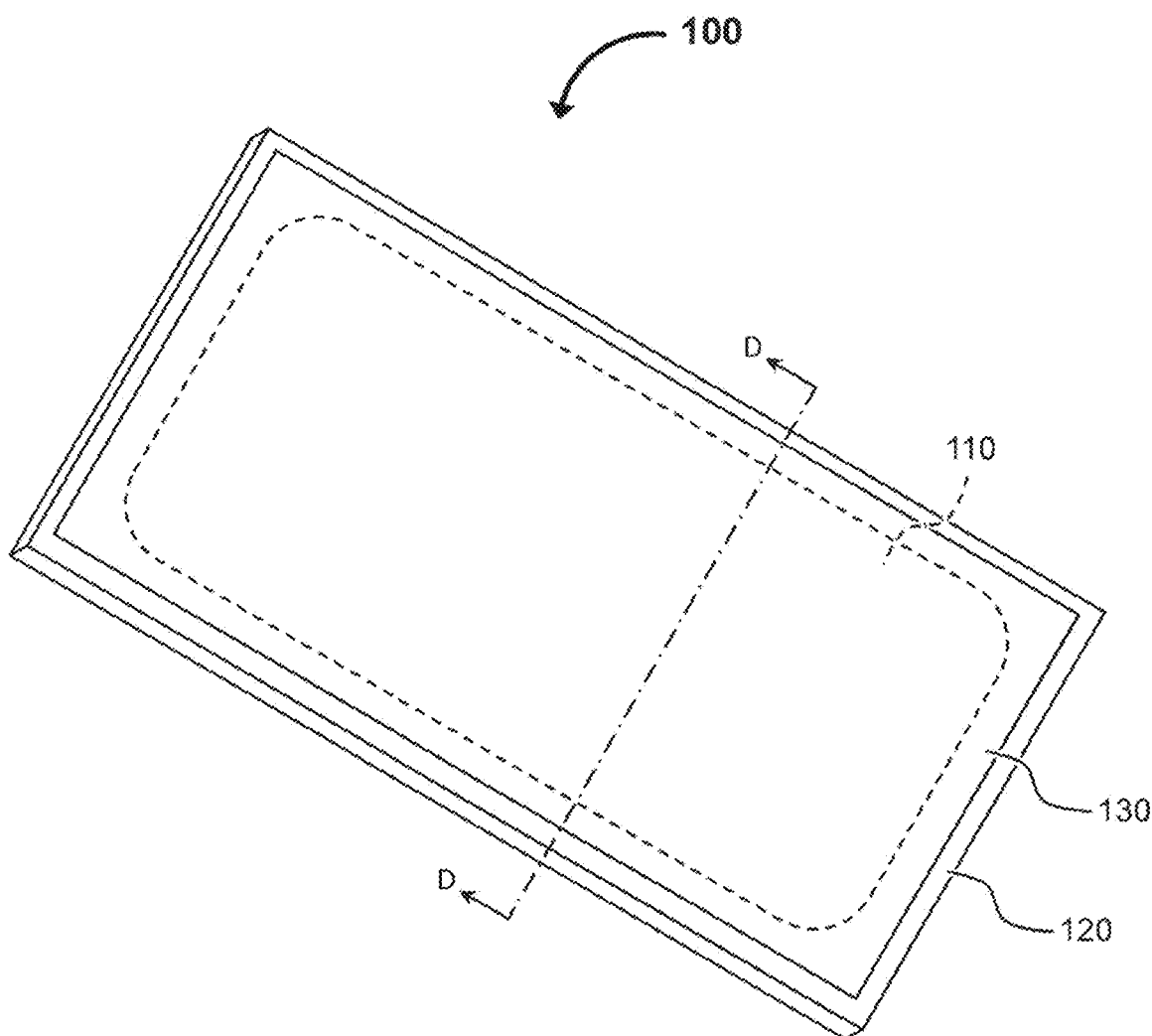
FIG. 8A is a perspective view showing a non-limiting exemplary embodiment of an inventive adhesive product of the present disclosure comprising a rigid support member, and further comprising a protective covering member.
Figure 8B:
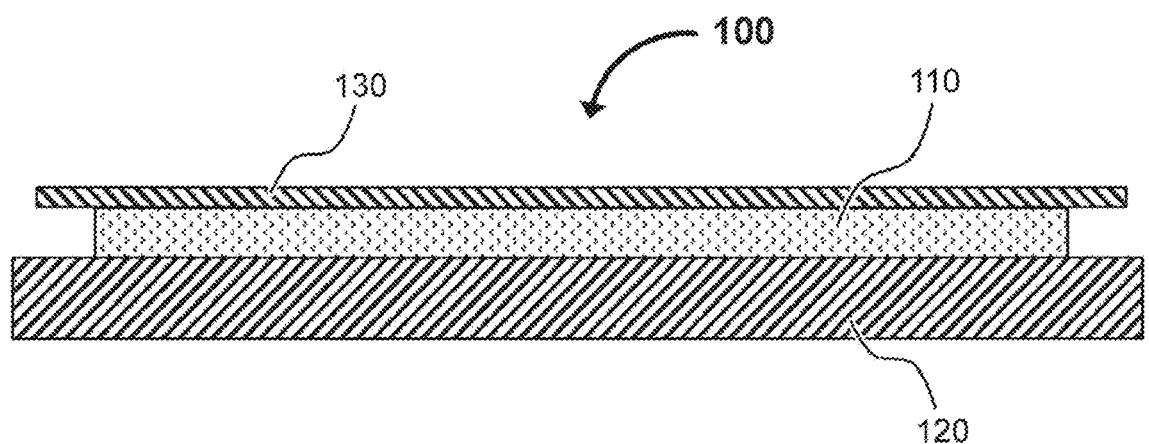
FIG. 8B is a side view of the inventive adhesive product of FIG. 8A taken along line D-D.
Figure 9A:
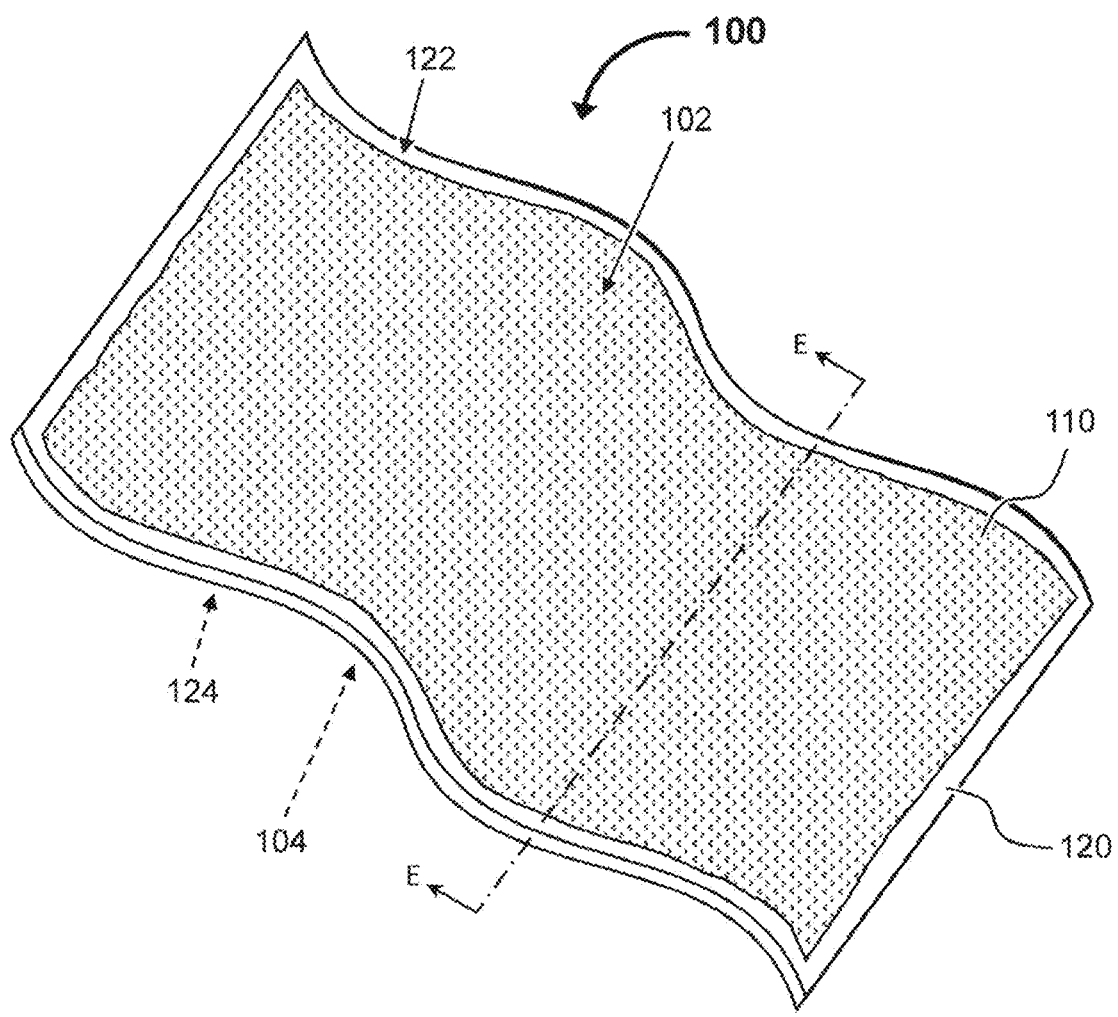
FIG. 9A is a perspective view showing a non-limiting exemplary embodiment of an inventive adhesive product of the present disclosure comprising a flexible support member.
Figure 9B:
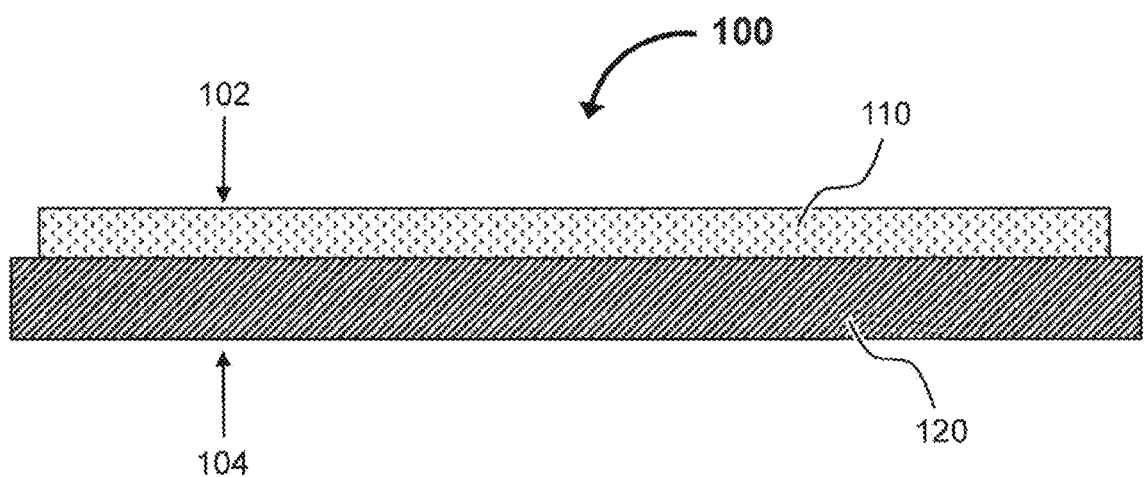
FIG. 9B is a side view of the inventive adhesive product of FIG. 9A taken along line E-E.
Figure 10A:
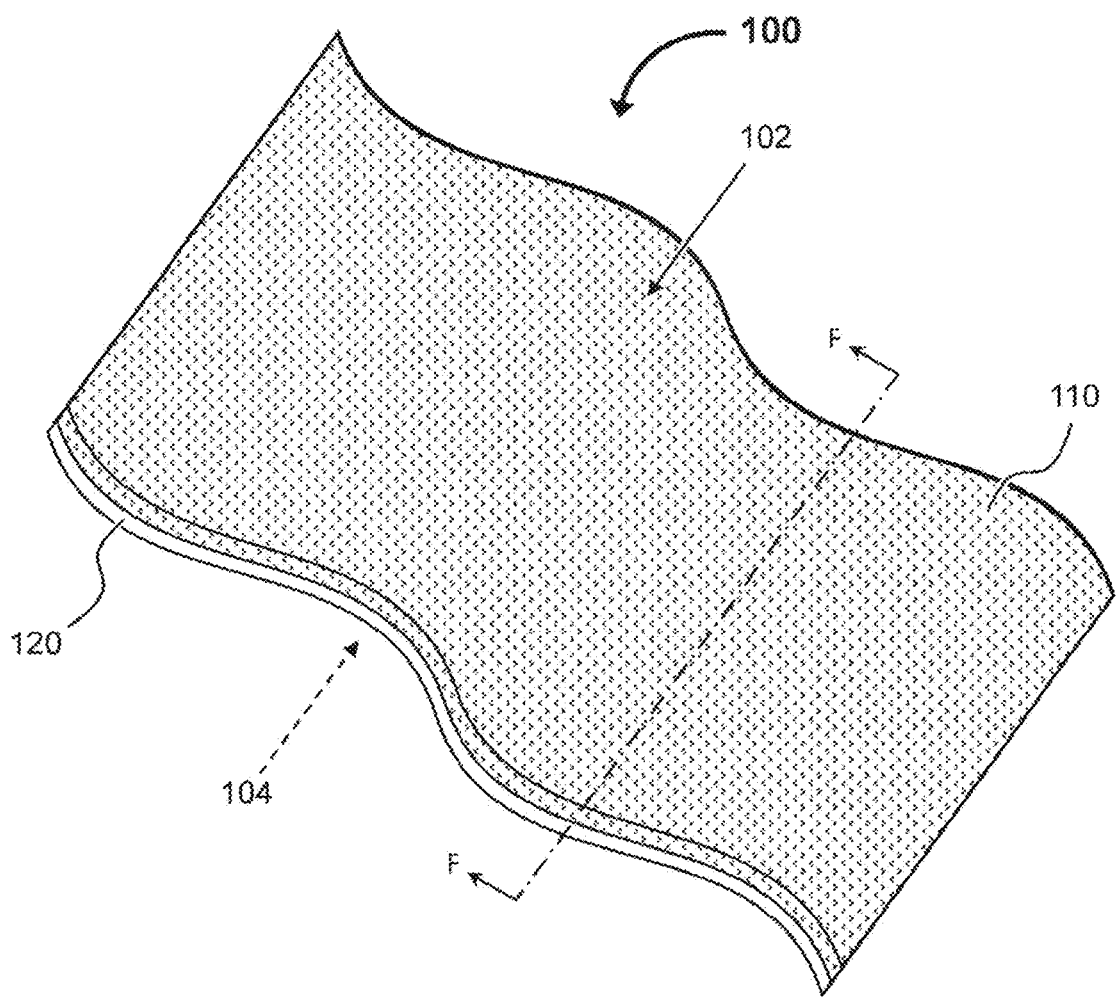
FIG. 10A is a perspective view showing a non-limiting exemplary embodiment of an inventive adhesive product of the present disclosure comprising a flexible support member.
Figure 10B:
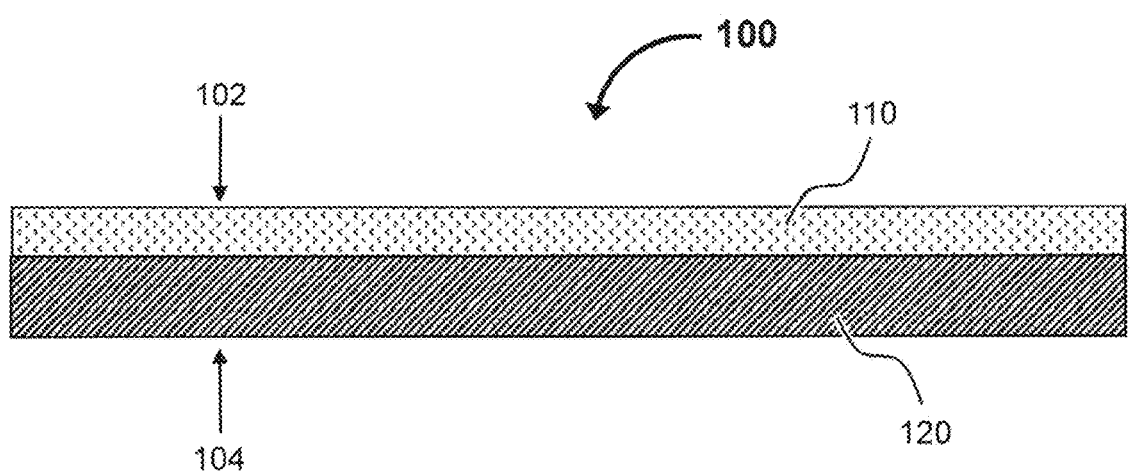
FIG. 10B is a side view of the inventive adhesive product of FIG. 10A taken along line F-F.

Because the polymeric product 100 of this embodiment exhibits adhesiveness on exposed surfaces thereof, it may be desirable to provide the product 100 with a removable protective covering member 130, such as described above (see e.g., FIGS. 8A-8B).

Figure 11:
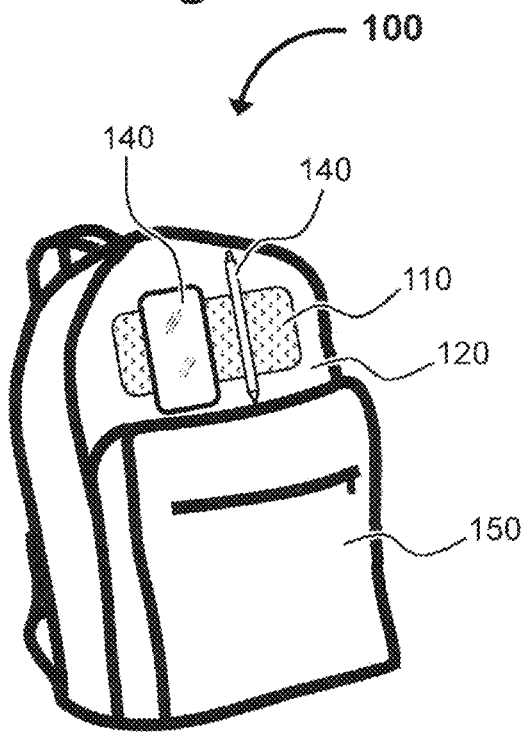
FIG. 11 is a perspective view showing a non-limiting exemplary embodiment of an inventive adhesive product formed from a conventional article in the form of a backpack, and further comprising items adhesively attached thereto in the form of a cellphone and a writing utensil.
Figure 12:
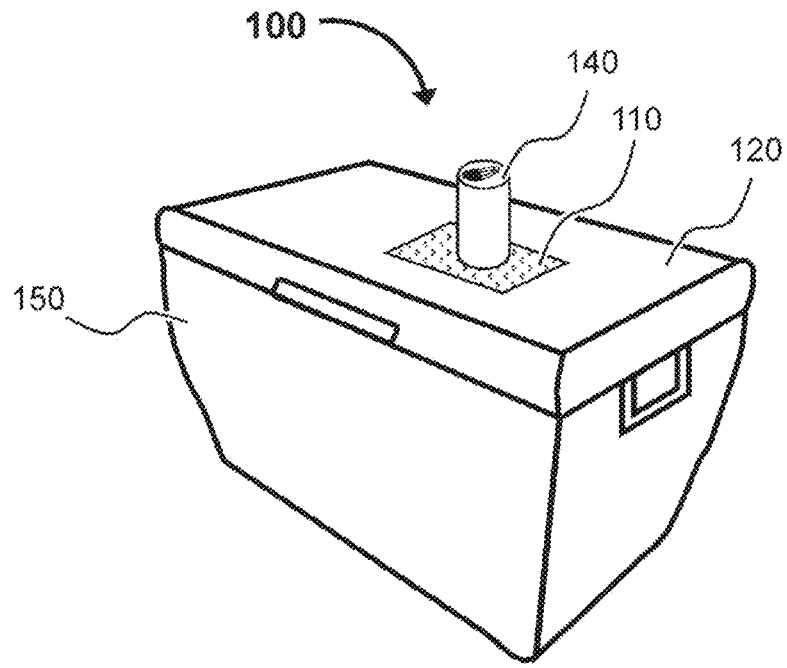
FIG. 12 is a perspective view showing a non-limiting exemplary embodiment of an inventive adhesive product formed from a conventional article in the form of a chest cooler, and further comprising an item adhesively attached thereto in the form of a beverage can.

Referring now to FIGS. 11-12, in some embodiments, the inventive adhesive products 100 of the present disclosure can comprise the thermoset viscoelastomeric polymer 110 and a conventional non-adhesive article 150 (e.g., a consumer good). In other words, application of the inventive polymer 110 to an existing non-adhesive article 150 effectively converts the article 150 into an inventive adhesive product 100 of the present disclosure. In such embodiments, the polymer 110 component will typically be disposed onto and/or at least partially into the article 150.

In some aspects of this embodiment, the polymer 110 component can be disposed onto an exposed surface of the article 150. For example, the reaction media can first be prefabricated (i.e., pre-formed into a fully cured polymer 110 component), and then adhesively applied to a surface of the article 150 (which basically serves as a support member 120) to form the inventive product 100 (i.e., relying substantially on adhesive bonding for attachment of the polymer 110 component to the article 150). Such prefabricated polymer 110 component of this example can comprise any functional shape profile or form, such as rectangular, circular, a frame, a strip, a substrate, a pad, an insert, an overlay, a film, a mat, a bead, a cord, a sphere, a random shape, a lump, and the like, without departing from the scope of the invention. In another example, uncured or partially-cured reaction media can be applied to a non-porous surface of an article 150 and then allowed to fully cure in situ (relying on adhesive bonding and chemical bonding for attachment of the polymer 110 component to the article 150). The reaction media of this aspect can be applied to the article 150 using techniques as would be known to persons having ordinary skill in the art, including pouring, printing, calendaring, casting, brushing, spraying, dipping, and the like. The polymer 110 component of this example can comprise any functional shape profile or form, such as a coating, a film, a strip, substrate, a pattern, a random shape, and the like, without departing from the scope of the invention. In such aspects, the polymer 110 component can typically be removed from the article 150.

In other aspects of this embodiment, the polymer 110 component can be disposed at least partially into the article 150. For example, uncured or partially-cured reaction media can be applied to a porous surface of an article 150 and allowed to at least partially soak into the interior structure of the article 150. The reaction media can then be allowed to fully cure in situ (relying on adhesive bonding, chemical bonding and interactions within the interior structure of the article 150 (e.g., friction, etc.) for attachment of the polymer 110 component to the article 150). The reaction media of this example can be applied to the porous surface of the article 150 using techniques as would be known to persons having ordinary skill in the art, including pouring, printing, calendaring, casting, brushing, spraying, dipping, and the like. The polymer 110 component of this example can comprise any functional shape profile or form, such as a coating, a strip, a pattern, a random shape, an integrated film, and the like, without departing from the scope of the invention. In such aspects, the polymer 110 component typically cannot be removed from the article 150.

For products 100 of this embodiment, the article 150 itself can provide structural support for the thermoset viscoelastomeric polymer 110. Although FIGS. 11 and 12 show inventive adhesive products 100 in the form of an adhesive backpack and an adhesive chest cooler, respectively, it should be understood that virtually any article 150 which has a surface that is compatible with the polymer 110 (including articles 150 that already comprise adhesive properties) can be utilized as suitable articles 150 herein, without departing from the scope of the invention. In addition, suitable articles 150 can be rigid, flexible or combinations thereof without departing from the scope of the invention. Accordingly, the article 150 can comprise any suitable natural or synthetic material that is compatible with the polymer 110. For example, the article 150 can comprise metal, wood, glass, ceramic, concrete, foams, plastics (e.g., polyethylene, polypropylene, etc.), polyesters, nylon, rayon, dacron, manila, polyethylene terephthalate, polyamides, polyurethane, linen, wool, cashmere, jute, polyacetates, polyacrylics, spandex, latex, orlon, cotton, silk, velvet, canvas, leather, fiberglass, acrylonitrile-butadiene-styrene polymers, polystyrene, and a host of other such natural and/or synthetic materials which can suitably support the thermoset viscoelastomeric polymer 110, as well as combinations thereof.

Desirably, the surface of the article 150 upon which the thermoset viscoelastomeric polymer 110 is disposed will have an overall attachment affinity to the polymer 110 which is greater than the adhesive affinity of the polymer 110 to an item 140 intended to be attached to the product 100, in order to prevent detachment of the polymer 110 from the article 150 upon removal of the item 140 from the product 100. Alternatively, the surface of the article 150 upon which the thermoset viscoelastomeric polymer 110 is disposed can have a relatively lower adhesive affinity towards the polymer 110 (as compared to any items 140 to be attached), provided however that the surface of the article 150 comprises suitable anchoring sites or is porous such that the resultant overall attachment force between the article 150 and the polymer 110 component is greater than the adhesive force between the item 140 and the polymer 110. Persons having ordinary skill in the art will recognize that the precise attachment force between the article 150 and the polymer 110 component will vary depending upon numerous factors, such as the properties of the article 150 material, the polymer 110 and the item 140 to be attached, for example. Accordingly, an article 150 material wherein the overall attachment force of the polymer 110 thereto is less than the overall adhesive force of an intended item 140 to the polymer 110 component would generally not be a suitable article 150 for the inventive products 100 of this embodiment.

In general, the thermoset viscoelastomeric polymer 110 component may be suitably sized with respect to an article 150 and/or an item 140 or array of items 140. For example, the polymer 110 component can have any desired shape profile (e.g., rectangular, square, trapezoidal, triangular, circular, oval, random, etc.), and may or may not have a similar shape to the article 150. Likewise, the dimensions of the polymer 110 component will typically be equal to or less than the particular surface dimensions of the article 150 upon which a polymer 110 component is disposed. However, the dimensions of the polymer 110 component can also be greater than the dimensions of such surface (in one or more dimensions) without departing from the scope of the invention. In addition, an article 150 can comprise a single polymer 110 component or multiple polymer 110 components without departing from the scope of the invention.

In this embodiment comprising an article 150, the thermoset viscoelastomeric polymer 110 component can have a thickness which may be uniform or non-uniform. There is no particular limit to the thickness, provided that the adhesive product 100 performs as intended by the user. For example, in one non-limiting exemplary aspect, an adhesively applied polymer 110 component (e.g., wherein a prefabricated polymer 110 component is adhesively applied to a surface of an article 150) can have a thickness of less than about 20 mm, such as less than about 10 mm, or less than about 5 mm, or about 1 mm to about 15 mm in thickness, to provide the desired cohesiveness and adhesiveness for removably adhering an item 140 to the product 100. In another non-limiting exemplary aspect, the polymer 110 component can be disposed in a thermoset bonded form (e.g., wherein the thermosetting reaction media is first applied to a surface of an article 150 in liquid form and then cured in situ), a lesser thickness of the polymer 110 component may be effectively utilized, such as a thickness of less than about 15 mm, or less than about 8 mm, or less than about 1 mm, or about 0.3 mm to about 10 mm in thickness, to provide the desired cohesiveness and adhesiveness for removably adhering an item 140 to the product 100. It should be understood that thicker polymer 110 components (i.e., thickness greater than 20 mm and 15 mm, respectively) can also be utilized without departing from the scope of the invention, such as for adhering relatively heavier items 140 for example, but are generally unnecessary.

Because the polymeric product 100 of this embodiment exhibits adhesiveness on exposed surfaces thereof, it may be desirable to provide the product 100 with a removable protective covering member 130.

Figure 14:
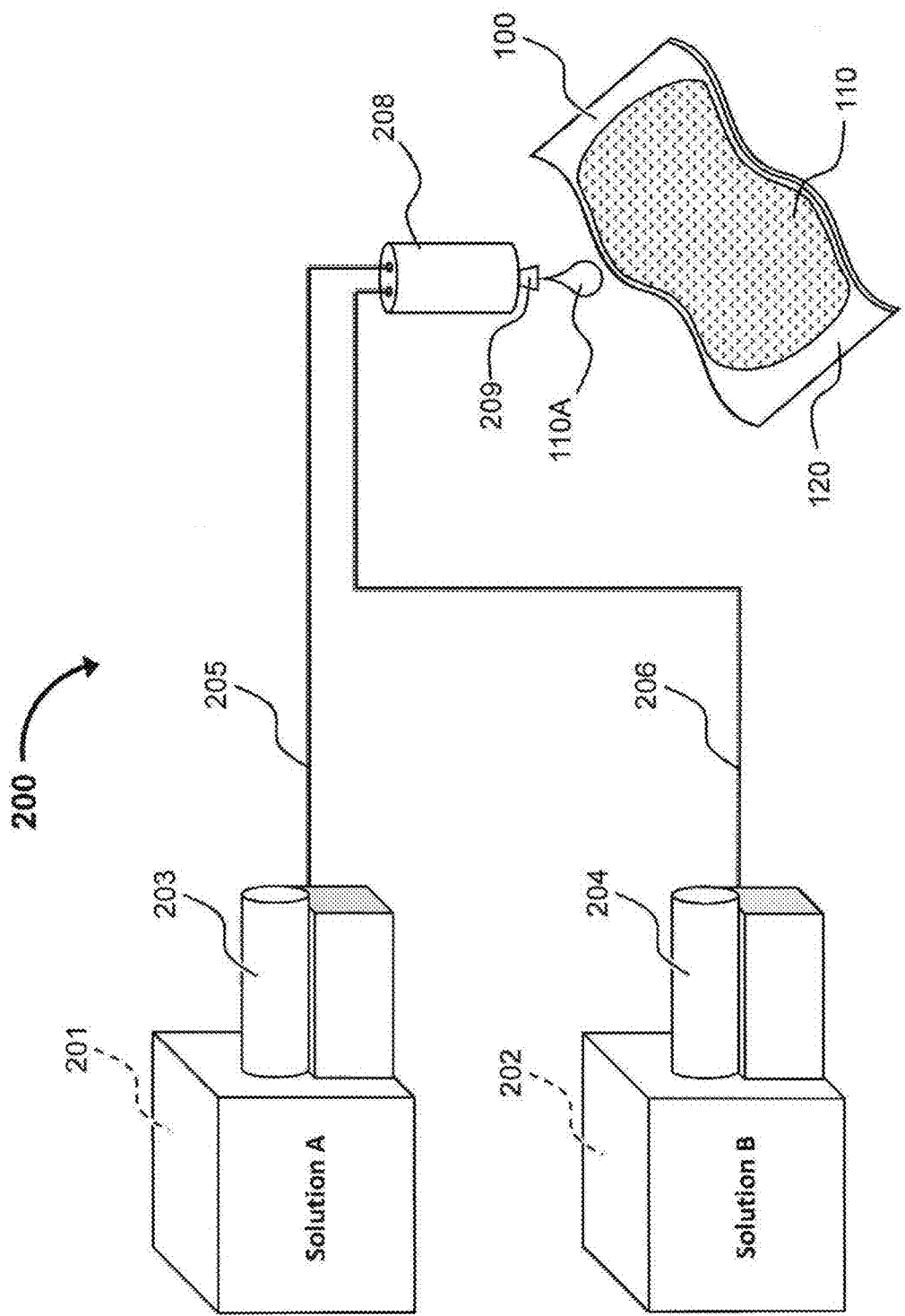
FIG. 14 is a schematic view showing a non-limiting exemplary polymer preparation and application process.

Referring now to FIG. 14, in some embodiments, the reaction media 110A which forms the thermoset viscoelastomeric polymer 110 component of the inventive products 100 of the present disclosure can be effectively disposed onto and/or at least partially into a support member 120 via conventional thermosetting techniques, such as depositing, pouring, printing, calendaring, casting, spraying, dipping, and the like, as would be known to persons having ordinary skill in the art. For example, in some aspects, the reaction media 110A can be applied to a support member 120 utilizing an application technique via a production process 200. In the illustrated non-limiting exemplary embodiment of FIG. 14, such production process 200 can be designed to accommodate a two-part solution component system (e.g., Solution A 201 and Solution B 202) to form and apply a suitable thermosetting reaction media 110A onto a support member 120, which can be subsequently cured in situ to form the polymer 110, and thus form an inventive product 100 herein. Such production process 200 can comprise a first metering pump 203 which feeds a first solution mix component 201 through a first feed line 205 to a mixing chamber 208. The production process 200 can also comprise a second metering pump 204 which feeds a second solution mix component 202 through a second feed line 206 to the mixing chamber 208. For example, in such arrangement, the first metering pump 203 can feed a first solution 201 (e.g., Solution A) comprising isocyanate prepolymer and epoxidized triglyceride plasticizer to the mixing chamber 208, and the second metering pump 204 can feed a second solution 202 (e.g., Solution B) comprising straight chain diol, crosslinking polyol, an optional viscosity reducing plasticizer and optionally other additives (e.g., catalyst, UV inhibitor/antioxidant, colorant, etc.) to the mixing chamber 208, each at suitable quantities and rates to form a mixture in the quantity ranges set forth herein. Accordingly, mixing of the two solutions 201, 202 occurs in the mixing chamber 208 to form the thermoset reaction media 110A. Upon mixing of the two solutions 201, 202, the formed reaction media 110A is then dispersed through the nozzle 209 while still in liquid form, effecting deposition of the reaction media 110A onto a desired support member 120, which is then allowed to fully cure into the inventive polymer 110 herein, thus forming an inventive product 100 of the present disclosure. Incidentally, a similar process could also be utilized for prefabricating a polymer 110 component, wherein the support member 120 would be replaced with a suitable mold (not shown). In such arrangement, the reaction media 110A would be deposited into the mold from the outlet 209 of the mixing chamber 208, and the deposited reaction media would be allowed to fully cure in the mold to form a prefabricated polymer 110 component. The polymer could then be removed from the mold to provide a standalone adhesive product 100, or it could be adhesively applied to support member 120 or article 150 to form an adhesive product 100 of the present disclosure. It should be understood that numerous other production processes and configurations (including batch processes and continuous processes) can also be utilized for the present invention, as would be known to persons having ordinary skill in the art, without departing from the scope of the invention.

The present invention may be better understood with reference to the following examples.

EXAMPLES

Example 1

A thermosetting reaction media was prepared by uniformly admixing together a two-part solution component mix (Part A Solution and Part B Solution) comprising:

| Ingredients: | Percent by Weight: |
|---|---|
| Part A Solution: | |
| Methylene diphenyl diisocyanate-based glycol prepolymer (ELASTOCAST TQZP23 available from BASF Corporation) | 5.39 wt % |
| Epoxidized triglyceride plasticizer (epoxidized soybean oil) | 44.61 wt % |
| Part B Solution: | |
| Polyether diol (ELASTOCAST C-4057 available from BASF Corporation) | 17.52 wt % |
| Polyether triol (ELASTOCAST C-4018 available from BASF Corporation) | 28.03 wt % |
| Viscosity reducing plasticizer (dibutyl sebacate) | 1.41 wt % |
| UV inhibitor (TINUVIN B75 available from BASF Corporation) | 1.12 wt % |
| Colorant (dye blend) | 1.40 wt % |
| Slow-acting Catalyst (COSCAT 83 available from Vertellus Holdings LLC) | 0.52 wt % |
| Total | 100% |

The Part A ingredients were mixed to form the Part A Solution. Separately, the Part B ingredients were mixed to form the Part B Solution. The Part A Solution and the Part B Solution were then combined and blended thoroughly to form a thermosetting reaction media. While still in liquid form, a quantity of the resulting thermosetting reaction media of this Example 1 was poured into a 9 cm×14 cm rectangular smooth surface PVC mold to a depth of about 5 mm. The reaction media was allowed to fully cure at ambient temperature (i.e., about 21° C.) to form a thermoset viscoelastomeric polymer 110 of the present disclosure. Upon fully curing, the polymer 110 was removed from the mold, thus providing an inventive standalone adhesive product 100 of the present invention in the form of an adhesive pad. It was observed that the product 100 felt relatively soft and was very flexible. Furthermore, upon pressing a finger into the product 100, the area surrounding the finger elevated upward, all of which demonstrates the viscoelastic properties of the product 100.

The standalone adhesive product 100 of this Example 1 was tested in accordance with the Adhesiveness and Cohesiveness Test set forth herein. The average adhesiveness was measured to be about 380 $g_f/cm^2$. It was also noted that no observable residual polymer remained upon the surface 345 of the cylinder 340 component of the testing apparatus 300 during each test iteration (see FIG. 15).

The standalone adhesive product 100 of this Example 1 was removed from the testing platform 360 of the testing apparatus 300 and placed onto the top side surface of a conventional article 150 in the form of a lid of a large size COLEMAN chest cooler (similar to FIG. 12) to form a second adhesive product 100 of the present disclosure. Items 140 in the form of a cellphone and a set of car keys were subsequently placed onto the exposed planar surface of the polymer 110 component of this second adhesive product 100. The lid was then opened approximately 100° from a horizontal position (to just past a vertical position, wherein the cellphone and keys were angularly facing the floor). Both items 140 (i.e., the cellphone and the car keys) remained securely attached to (i.e., remained stabilized upon) this second adhesive product 100. The lid was then returned to a closed position and both items 140 (i.e., the cellphone and the set of car keys) were removed by hand via exerting a sufficient removal force to each item 140 to overcome the adhesive force of the polymer 110 component of the product 100. It was observed that the portion of the polymer 110 component in contact with both items 140 (i.e., the cellphone and the set of car keys) stretched a bit in the direction of the pulling force, but then quickly (i.e., within about 1-2 seconds) returned to its original shape upon complete detachment from the items 140. It was also observed that during the item removal process, the polymer 110 component remained firmly attached to the cooler lid. The items 140 were then each inspected for polymer 110 residue, and no residual polymer 110 was visually observed on either the cellphone or the car keys. This second adhesive product 100 was thus ready for re-use.

The polymer 110 component was then removed from the cooler lid. It was observed that a greater removal force was required, as compared to the force required for removal of the items 140. This is likely due to a greater amount of overall surface area of the polymer 110 component being in contact with the cooler lid, as compared to a lesser surface area of the polymer 110 component being in contact with each of the items 140. It was also observed that during removal from the cooler lid, the polymer 110 component initially stretched to approximately twice its relaxed length, but the polymer 110 component did not break or tear. In addition, upon complete detachment from the cooler lid, the polymer 110 component quickly returned to its original shape profile and dimensions.

The procedures performed herein demonstrate the unique viscoelastic, adhesiveness, cohesiveness, releasability and re-usability features of the inventive polymers 110 and products 100 of this disclosure.

The polymer 110 component of this Example 1 was then placed on the floor and subsequently removed therefrom. It was observed that contaminants 190 in the form of dirt, lint and other debris had become attached thereto. The polymer 110 component was then held by hand under a faucet and lukewarm tap water was allowed to run onto the product 100. It was observed that the polymer 110 component felt significantly less adhesive while exposed to and coated with water, and it was further observed that the contaminants 190 (i.e., the dirt, lint and debris) rinsed off the pad within about 5 seconds. The polymer 110 component was then removed from the water, excess water was shaken off, and the polymer 110 component was placed on a screen in a laid-flat configuration and allowed to air dry. Upon fully drying, it was observed that the polymer 110 component had been restored to its original condition, including its adhesiveness. Thus, the polymer 110 component was ready for re-use, such as a standalone adhesive product 100, or for incorporation onto a support member 120 or article 150 to form other adhesive products 100 of the present disclosure.

The polymer 110 component was once again tested in accordance with the Adhesiveness and Cohesiveness Test set forth herein, and the average adhesiveness was measured to be about 382 $g_f/cm^2$. The additional procedures performed herein further demonstrate the unique washability/cleansability and restorative re-usability of the inventive polymers 110 and products 100 of this disclosure.

Example 2

A thermosetting reaction media was prepared by uniformly admixing together a two-part solution component mix (Part A Solution and Part B Solution) comprising:

| Ingredients: | Percent by Weight: |
|---|---|
| Part A Solution: | |
| Methylene diphenyl diisocyanate-based glycol prepolymer (ELASTOCAST TQZP23) | 5.39 wt % |
| Epoxidized triglyceride plasticizer (epoxidized soybean oil) | 40.00 wt % |
| Part B Solution: | |
| Polyether diol (ELASTOCAST C-4057) | 17.52 wt % |
| Polyether triol (ELASTOCAST C-4018) | 28.03 wt % |
| Viscosity reducing plasticizer (dibutyl sebacate) | 6.02 wt % |
| UV inhibitor (TINUVIN B 75) | 1.12 wt % |
| Colorant (dye blend) | 1.40 wt % |
| Slow-acting Catalyst (COSCAT 83) | 0.52 wt % |
| Total | 100% |

The Part A ingredients were mixed to form the Part A Solution. Separately, the Part B ingredients were mixed to form the Part B Solution. The Part A Solution and the Part B Solution were then combined and blended thoroughly to form a thermosetting reaction media. While still in liquid form, a quantity of the resulting thermosetting reaction media of this Example 2 was poured into a 9 inch×12 inch (22.9 cm×30.5 cm) rectangular non-stick cake pan, which served as a mold, to a depth of about 2 mm. The reaction media was allowed to fully cure at ambient temperature (i.e., about 21° C.) to form an adhesive and cohesive thermoset viscoelastomeric polymer 110 of the present disclosure. Upon fully curing, the polymer 110 component was removed from the mold and placed (and generally centered) upon a 10 inch×12 inch (25.4 cm×30.5 cm) sheet of WAX-TEX waxed paper (available from Walmart, having a place of business located in Bentonville, Arkansas, USA) which served as a protective covering member 130. It was observed that the polymer 110 component felt relatively soft and was very flexible. It was also observed that the protective covering member 130 lightly adhered to the polymer 110 component, but to a lesser degree than the polymer 110 component adhered to the user's fingers, and thus the protective covering member 130 could be relatively easily peeled away from the polymer 110 component. The polymer 110 component and protective covering member 130 combination was then flipped over (such that the protective covering member 130 was positioned on the top side of the polymer 110 component), and the exposed planar surface of the polymer 110 component was aligned with, and disposed upon, the surface of an empty metal drawer (i.e., a support member 120) of a conventional non-adhesive article 150 in the form of a tool chest, thus forming an inventive adhesive product 100 of the present disclosure.

The protective covering member 130 was removed from the polymer 110 component and it was observed that the polymer 110 component remained fully adhered to the drawer surface of the tool chest throughout such removal. Items 140 in the form of a heavy hammer, an adjustable wrench and a screwdriver were placed upon the polymer 110 component of the adhesive product 100. The drawer of the product 100 was then forcefully shut and opened several times. Afterward, it was observed that the items 140 had not moved or repositioned from their original placement (i.e., the items 140 remained stabilized upon the inventive product 100). Each item 140 was then removed by hand from the polymer 110 component of the adhesive product 100 (by exerting a sufficient removal force to overcome the adhesive force of the polymer 110 component) and each item 140 was inspected, wherein no residual polymer 110 was visually observed upon any of the items 140. It was also observed that as each item 140 was removed from the polymer 110 component of the adhesive product 100, the portion of the polymer 110 component in contact with each item 140 stretched in the direction of the removal force, but quickly returned to its original form upon complete detachment from each item 140. It was further observed that during the process of removing each item 140, the polymer 110 component remained fully adhered to the drawer surface of the inventive product 100.

Example 3

A thermosetting reaction media was prepared by uniformly admixing together a two-part solution component mix (Part A Solution and Part B Solution) comprising:

| Ingredients: | Percent by Weight: |
|---|---|
| Part A Solution: | |
| Methylene diphenyl diisocyanate-based glycol prepolymer (ELASTOCAST TQZP23) | 6.60 wt % |
| Epoxidized triglyceride plasticizer (epoxidized soybean oil) | 27.35 wt % |
| Viscosity reducing plasticizer (dibutyl sebacate) | 7.68 wt % |
| Part B Solution: | |
| Polyether diol (ELASTOCAST C-4057) | 25.64 wt % |
| Polyether triol (ELASTOCAST C-4018) | 31.62 wt % |
| UV inhibitor (TINUVIN B 75) | 1.03 wt % |
| Heat-activated Catalyst (FOMREZ UL-29, available from Momentive Performance Chemicals, Inc.) | 0.08 wt % |
| Total | 100% |

The Part A ingredients were mixed to form the Part A Solution. Separately, the Part B ingredients were mixed to form the Part B Solution. The Part A Solution and the Part B Solution were then combined and blended thoroughly to form a thermosetting reaction media. While still in liquid form, a quantity of the resulting thermosetting reaction media of this Example 3 was poured onto a rigid support member 120 in the form of a 9 inch×12 inch (22.9 cm×30.5 cm) rectangular pane of relatively smooth polypropylene (having a thickness of about 3 mm). The reaction media was spread out upon the top side surface of the support member 120 using a plastic spatula to within about 5 mm of the perimeter edges, such that the thickness of the reaction media was about 0.5 mm. The support member 120 and reaction media combination was then carefully placed into a lab oven (with the reaction media facing upward) and the combination was heated to about 80° C. to initiate the heat-activated catalyst of this Example 3. The reaction media was then allowed to cure in situ to form an adhesive and cohesive thermoset viscoelastomeric polymer 110 in the form of a film. Accordingly, upon the reaction media fully curing into a polymer 110 upon the support member 120, an inventive adhesive product 100 of the present disclosure was formed. Such a rigid adhesive product 100 has numerous potential uses, such as a hygienic tray for example (e.g., stabilizing medical instruments, presenting medications to patients, stabilizing eating utensils during travel, etc.).

It was observed that, in comparison to the adhesive product 100 of Example 2, the polymer 110 component of this Example 3 product 100 was noticeably more difficult to remove from the support member 120 surface. Although the polymer 110 component stretched significantly during its removal from the rigid support member 120, it did not tear or break apart, and it quickly returned to its original shape profile and dimensions upon complete detachment from the support member 120. This appears to indicate that, in addition to adhesive bonding (as in the case of Example 2), the polymer 110 component of this Example 3 was also adhered to the support member 120 via additional bonding (likely chemical bonding) due to the in situ curing of the reaction media upon the rigid support member 120.

Example 4

A flexible support member 120 in the form of an 11 inch×12 inch (27.9 cm×30.5 cm) rectangular nonwoven substrate was provided. The nonwoven substrate was a CLOROX disinfecting wipe (available from The Clorox Company, having a place of business located in Oakland, California, USA) which had been thoroughly washed in tap water (to remove any liquid chemicals) and allowed to fully air dry. A thermosetting reaction media was prepared by uniformly admixing together the same two-part solution component mix (Part A Solution and Part B Solution) of Example 3. While still in liquid form, a thin coating of the reaction media was disposed upon the top side major planar surface of the flexible support member 120 using a paint brush. It was observed that a portion of the reaction media migrated into the interior structure of the nonwoven substrate. The flexible support member 120 and reaction media combination was then carefully placed into a lab oven in a laid-flat configuration (with the reaction media facing upward) and was heated to about 80° C. to initiate the heat-activated catalyst of this Example 4. The reaction media was allowed to cure in situ to form an inventive adhesive and cohesive thermoset viscoelastomeric polymer 110 in the form of a coating. Accordingly, upon the reaction media fully curing into a polymer 110 upon the support member 120, an inventive flexible adhesive product 100 of the present disclosure was formed. It was observed that the polymer 110 component of the product 100 of this Example 4 could not be removed from the support member 120 which, in addition to the adhesive bonding and chemical bonding, is likely due to the cohesive entanglement of the polymer 110 within the porous interior structure of the nonwoven substrate.

While such a flexible adhesive product 100 has numerous potential uses, it was utilized for this Example 4 as a lint remover. Accordingly, the adhesive side of the product 100 (i.e., the polymer 110 component side) was pressed by hand upon a cotton sweater garment and then removed therefrom. It was observed that contaminants 190 in the form of lint, cotton fibers and a strand of hair were adhered to the adhesive product 100. The product 100 was then placed into a solution of tap water and soap (DAWN dish detergent) and the polymer 110 component portion of the product 100 was lightly rubbed by hand for about 5 seconds, wherein all of the contaminants 190 (i.e., the lint, cotton fibers and hair) were visually released therefrom. It was observed that the adhesiveness of the product 100 significantly diminished after being placed into the soap solution. The product 100 was removed from the soap solution and rinsed with cool tap water for about 5 seconds (to substantially wash out the soap solution). The product 100 was then removed from the water flow, shaken briskly, and lightly squeezed by hand to remove excess water. It was observed that while wet, the adhesiveness of the polymer 110 component remained significantly diminished, and that upon squeezing, the polymer 110 component briefly adhered to itself, but quickly and easily released from itself as well. It was also observed that the polymer 110 component did not detach from the flexible support member 120 at any time during the cleansing procedure. The damp product 100 was placed on a countertop in a laid-flat configuration with the polymer 110 component facing upward (i.e., away from the countertop) and allowed to fully air dry. After the product 100 had fully dried, the polymer 110 component was touched with a finger and it was observed that the approximate original adhesiveness had returned. Thus, the adhesive product 100 of this Example 4 was ready for re-use. This Example 4 demonstrates, inter alia, the adhesiveness, cohesiveness, cleansability and re-usability of the inventive polymer 110 and products 100 of the present disclosure.

It will be appreciated that details of the foregoing examples, given for purposes of illustration, are not to be construed as limiting the scope of this invention. Although only a few exemplary embodiments of this invention have been described in detail above, persons having skill in the art will readily appreciate that many modifications are possible in the description and examples without materially departing from the novel teachings and advantages of this invention. For example, features described in relation to one example may be incorporated into any other example of the invention.

Accordingly, all such modifications are intended to be included within the scope of this invention, which is defined in the following claims and all equivalents thereto. Further, it is recognized that many embodiments may be conceived that do not achieve all of the advantages of some embodiments, particularly of the desirable embodiments, yet the absence of a particular advantage shall not be construed to necessarily mean that such an embodiment is outside the scope of the present invention. As various changes could be made in the above constructions without departing from the scope of the invention, it is intended that all matter contained in the above description shall be interpreted as illustrative and not in a limiting sense

What is claimed is:
1. An adhesive and cohesive thermoset viscoelastomeric polymer derived from a thermosetting reaction media comprising:
   a) about 2 wt % to about 10 wt % isocyanate prepolymer;
   b) about 35 wt % to about 75 wt % polyols; and
   c) about 10 wt % to about 60 wt % plasticizer;
   wherein the polyols comprise about 1 wt % to about 65 wt % of the total reaction media weight straight chain diol and about 3 wt % to about 50 wt % of the total reaction media weight crosslinking polyol; and
   wherein the plasticizer comprises about 10 wt % to less than 45 wt % of the total reaction media weight epoxidized triglyceride plasticizer and 0 wt % to about 40 wt % of the total reaction media weight viscosity reducing plasticizer.

2. The thermoset viscoelastomeric polymer of claim 1, wherein the isocyanate prepolymer comprises a diisocyanate.

3. The thermoset viscoelastomeric polymer of claim 1, wherein the straight chain diol and the crosslinking polyol each have a molecular weight of about 1,000 to about 20,000.

4. The thermoset viscoelastomeric polymer of claim 1, wherein the crosslinking polyol comprises triol.

5. The thermoset viscoelastomeric polymer of claim 4, wherein the diol comprises polyether diol and the triol comprises polyether triol.

6. The thermoset viscoelastomeric polymer of claim 1, further comprising a straight chain diol to crosslinking polyol weight ratio of about 1:3 to about 3:1.

7. The thermoset viscoelastomeric polymer of claim 1, wherein the plasticizer comprises about 10 wt % to less than about 43 wt % of the total reaction media weight epoxidized triglyceride plasticizer.

8. The thermoset viscoelastomeric polymer of claim 1, wherein the epoxidized triglyceride plasticizer comprises an epoxidized vegetable oil.

9. The thermoset viscoelastomeric polymer of claim 1, wherein the viscosity reducing plasticizer is an ester plasticizer.

10. The thermoset viscoelastomeric polymer of claim 9, wherein the ester plasticizer is selected from the group consisting of sebacates, adipates, phthalates, isophthalates, maleates, azelates and glutarates.

11. The thermoset viscoelastomeric polymer of claim 1, wherein the viscosity reducing plasticizer has a molecular weight of less than about 750.

12. The thermoset viscoelastomeric polymer of claim 1, wherein the viscosity reducing plasticizer has a dipole moment of at least about 1.5 D.

13. The thermoset viscoelastomeric polymer of claim 1, further comprising an epoxidized triglyceride plasticizer to viscosity reducing plasticizer weight ratio of about 6:1 to about 1:3.

14. The thermoset viscoelastomeric polymer of claim 1, further comprising an adhesiveness of about 100 $g_f/cm^2$ to about 2,500 $g_f/cm^2$.

15. The thermoset viscoelastomeric polymer of claim 1, wherein the thermoset viscoelastomeric polymer is in the form of a standalone adhesive product.

16. The thermoset viscoelastomeric polymer of claim 1, wherein the thermoset viscoelastomeric polymer is disposed upon a support member to form an adhesive product.

17. The thermoset viscoelastomeric polymer of claim 1, wherein the thermoset viscoelastomeric polymer is disposed upon a conventional non-adhesive article to form an adhesive product.

18. An adhesive product comprising an adhesive and cohesive thermoset viscoelastomeric polymer and a support member, wherein the polymer is disposed upon or at least partially into the support member.

19. The adhesive product of claim 18, wherein an item disposed upon the adhesive product is substantially prevented from movement thereupon.

20. The adhesive product of claim 18, further comprising releasability properties such that an item adhered to the adhesive product can be removed upon application of a sufficient removal force without detachment of the polymer from the support member.

21. The adhesive product of claim 18, further comprising cleansability and reusability properties, wherein a contaminant adhered to the adhesive product can be removed therefrom via washing with water, and wherein an adhesiveness of the adhesive product substantially returns to its original state upon fully drying.

22. The adhesive product of claim 18, further comprising antimicrobial properties.

23. The adhesive product of claim 18, wherein the support member is a rigid material.

24. The adhesive product of claim 18, wherein the support member is a flexible material.

25. The adhesive product of claim 18, wherein the support member is provided by a non-adhesive article.

26. The adhesive product of claim 18, wherein the adhesive and cohesive thermoset viscoelastomeric polymer is prepared by a thermosetting reaction media comprising:

a) about 2 wt % to about 10 wt % isocyanate prepolymer;

b) about 35 wt % to about 75 wt % polyols; and c) about 10 wt % to about 60 wt % plasticizer;

wherein the polyols comprise about 1 wt % to about 65 wt % of the total reaction media weight straight chain diol and about 3 wt % to about 50 wt % of the total reaction media weight crosslinking triol; and wherein the plasticizer comprises about 10 wt % to less than about 45 wt % of the total reaction media weight epoxidized triglyceride plasticizer and 0 wt % to about 40 wt % of the total reaction media weight ester plasticizer.

27. The adhesive product of claim 26, wherein the isocyanate prepolymer is a diisocyanate prepolymer.

28. The adhesive product of claim 26, wherein the epoxidized triglyceride plasticizer is epoxidized soybean oil.

29. The adhesive product of claim 26, wherein the ester plasticizer is dibutyl sebacate.

* * * * *